United States Patent [19]

Bradley et al.

[11] Patent Number: 4,878,245

[45] Date of Patent: Oct. 31, 1989

[54] CONTROL AND METERING SYSTEM FOR PAY TELEVISION OVER A CABLE NETWORK

[76] Inventors: Graham C. Bradley, 3200 College Avenue, Regina, Saskatchewan, Canada, S4T 1V9; Alton O. Stretten, 3615 McCallum Avenue, Regina, Saskatchewan, Canada, S4S OS6; John P. Stretten, 14 Susses Crescent, Regina, Saskatchewan, Canada, S4T6A2; Rex B. Wentzel, #2 Rheims Ct., Lake St., St. Louis, Mo. 63367

[21] Appl. No.: 5,979

[22] Filed: Jan. 22, 1987

Related U.S. Application Data

[63] Continuation-in-part of Ser. No. 823,759, Jan. 29, 1986, abandoned.

[51] Int. Cl.⁴ .................. H04N 7/16; H04N 7/10; H04H 1/00
[52] U.S. Cl. .................................. 380/10; 380/7; 358/86; 358/349; 455/4
[58] Field of Search ............... 380/7, 10, 20; 358/349, 358/84, 86; 307/256, 259; 333/103, 104, 262; 455/1–4

[56] References Cited

U.S. PATENT DOCUMENTS

| | | | |
|---|---|---|---|
| 3,813,482 | 5/1974 | Blonder | 380/15 |
| 3,859,457 | 1/1975 | Kirk, Jr. | 455/1 |
| 3,989,887 | 11/1976 | Murphy | 455/1 |
| 4,012,583 | 3/1977 | Kramer | 358/84 |
| 4,268,860 | 5/1981 | Blonder | 380/7 |
| 4,272,791 | 6/1981 | Rifken | 358/86 |
| 4,367,557 | 1/1983 | Stern et al. | 455/1 |
| 4,425,579 | 1/1984 | Merrell | 358/86 |
| 4,475,123 | 10/1984 | Dumbauld et al. | 380/13 |
| 4,577,224 | 3/1986 | Ost | 380/2 |
| 4,594,609 | 6/1986 | Romao et al. | 380/7 |
| 4,598,312 | 7/1986 | Geissler et al. | 358/86 |
| 4,599,647 | 7/1986 | George et al. | 380/20 |
| 4,710,956 | 12/1987 | Rast | 380/20 |
| 4,717,970 | 1/1988 | Long | 358/86 |

Primary Examiner—Thomas H. Tarcza
Assistant Examiner—Linda J. Wallace
Attorney, Agent, or Firm—Larson & Taylor

[57] ABSTRACT

An improved control and metering system for pay television distribution over a cable network. A control unit is located near each receiver on a subscribers premises and a secure filter, switching and metering unit is located external to the subscribers home. For the basic apparatus power and control signals needed to operate the external unit require no separate wiring as these signals are multiplexed over the coaxial cable that carries the TV signal into the home. An improved switch in the external unit activates a temperature compensated digital metering unit that displays either (or both) the time that the premium programming has been accessed or the totalized cost of the pay programming accessed. When implemented in high density housing districts common equipment is centralized and the apparatus is known as a switched star configuration. Also included is apparatus that permits metering to be accomplished at a central location for a community. The apparatus allows for tiering of pay programming utilizing different rates. The system is secure without scrambling or jamming. Another version of the apparatus permits Cable TV Operators to sell common carrier services to independent programmers according to utilization. The apparatus also allows for interfacing the cable TV network with a fibre optic television distribution network, for subscribed switching between the two systems and the metering of the utilization of such an apparatus. The system introduces the idea of a fibre optic video party-line to reduce implementation costs.

14 Claims, 14 Drawing Sheets

CONTROL AND METERING SYSTEM FOR PAY TELEVISION OVER A CABLE NETWORK

This application is a continuation in part of application Ser. No. 823,759 filed Jan. 29, 1986 now abandoned.

BACKGROUND OF THE INVENTION

This invention relates to apparatus for use in control and metering of Pay-television signals over a cable network. Most Pay TV systems employed to date require that the Premium signals be scrambled to prevent reception by unauthorized cable TV subscribers. Authorized subscribers pay for the premium programming on a flat fee basis. Such systems have had a difficult time in the marketplace because of the high cost for the sophisticated descrambling equipment, or the unauthorized use of descrambling equipment where inexpensive scrambling systems are employed by the cable TV operator, and/or, the uncertainty of the value of the premium services to non-pay TV subscribers in view of the required flat rate payment commitment.

Other Pay-for-Use proposals such a Spencer (U.S. Pat. No. 3,504,109), Eisele (U.S. Pat. No. 3,368,031), Sargent (U.S. Pat. No. 3,335,421) and Murphy (U.S. Pat. No. 3,989,887) have failed to make an impact because of the high cost of their implementation. Spencer requires additional wiring be installed in each subscriber's residence; and Sargent proposes the D.C. power for system control be provided from the cable operators studio, most existing cable systems do not allow D.C. (or utility frequency A.C.) power to pass unhindered from the operator's studio into the subscriber's home. In addition both Sargent and Eisele do not allow for both premium pay services and normal cable TV services being distributed on the same coaxial distribution system.

Murphy does allow for such an arrangement but specifies the use of JAMMING circuitry that generates undesirable radio frequency energy. Also because of the jamming method employed Murphy's system is cumbersome to implement as it requires the use of one filter for each channel to be jammed. The use of low-cost commonly available broadband multichannel band blocking filters is precluded. Murphy had not foreseen the need to custom tailor each subscribers filtering arrangement, or the need to switch 6 to 15 channels simultaneously. Why Murphy chose to employ jamming circuitry is uncertain, but from the circuitry shown in his patent it appears that he could not obtain adequate filtered channel insertion loss and thus was forced to jam the channel as well as filter it. His patent fails to instruct any method of keeping the level of a filtered channel 50 dB below that of the unfiltered channel as his system does not require such. In addition to extensive trap filter circuitry and jamming circuits, Murphy also requires simultaneously positive and negative power to operate his apparatus making it expensive for a one unit per home installation. None of these systems make allowance for parental control requirements, simultaneous viewing of 2 or more premium services, multiple-point operation, and control by external apparatus such as video recorders and simple timers. Murphy and the others have also not foreseen the need to employ sampling or preview circuitry to stimulate impulse buying.

DiLorenzo (U.S. Pat. No. 4,317,213) teaches how Parental Lockout may be accomplished through the generation and transmission of interfering radio frequencies, he does not instruct how it could be accomplished to the satisfaction of radio spectrum regulatory agency requirements. Rifken (U.S. Pat. No. 4,272,791) illustrates a scheme to permit the simultaneous recording of a Premium TV channel and viewing of a non-scrambled channel, or vice-versa. Rifken's solution solves a problem that subscribers with VCRs have if their premium programming is scrambled but is not applicable to the apparatus embodied in this invention as no scrambling is required. Rifken foresees no requirement for the VCR to control any switching apparatus.

SUMMARY OF THE INVENTION

It is one object of the invention there to provide an improved cable transmission system.

According to a first aspect of the invention there is provided a secure pay-for-use television distribution system comprising a cable distribution network arranged to distribute Subscription television and PFU television signals from a central cable station to a plurality of subscriber premises, a plurality of filter units each mounted between the cable network and a subscriber premises to control the transmission of said television signals to the subscriber premises, a plurality of subscriber actuable control units each for mounting in a respective subscriber premises and connectable to the respective filter unit by a line for supplying control signals to the unit and for receiving therefrom said television signals, said filter unit comprising inlet terminal means for connection to the cable network, outlet terminal means for connection to said line, means defining a first and a second circuit path between said inlet terminal means and said outlet terminal means, filter means in at least said first circuit path arranged to provide sufficient rejection loss to said PFU television signals so that the PFU signals emitted from the first circuit path cannot generate a TV picture and arrange to provide a sufficiently low insertion loss to the Subscription television signals so as not to interfere with the generation of a TV picture therefrom, said second circuit path being arranged to transmit at least said PFU television signals, and switching circuit means in said first and second circuit paths responsive to said control signals from said control unit to open and close alternate ones of said first and second circuit paths, said switching circuit means being arranged to open and close said first circuit path upstream and downstream of said filter means.

According to a second aspect of the invention there is provided a secure pay-for-use television distribution system comprising of cable, distribution network, distribution of signals from a central cable station to a plurality of subscriber premises, a plurality of filter units each mounted between the cable network and a subscriber premises to control the transmission of signals to the subscriber premises, a plurality of subscriber actuable control units each for mounting in a respective subscriber premises and connectable to the respective filter unit by a line for supplying control signals to the unit and for receiving therefrom the transmitted signals, said filter unit comprising inlet terminal means for connection to the cable network, outlet terminal means for connection to said line, means defining a first and a second circuit path between said inlet terminal means and said outlet terminal means, filter means in at least said first circuit path arrange to provide sufficient rejection loss to a TV channel signal so that the TV channel signal emitted from the first circuit path cannot generate a TV picture and arrange to provide a sufficiently low insertion loss to the TV channel signals so as not to interfere with the generation of a TV picture therefrom, and switching circuit means in said first and second circuit paths responsive to said control signals from said control unit to open and close alternate ones of said first and second circuit paths, said switching circuit means being arranged to open and close said first circuit path upstream and downstream of said filter means including metering means for providing a record of time of use of at least one of said first and second circuit paths, microprocessor means responsive to said control signals for actuating said switching means and said metering means and a single telephone pair connected to a plurality of said filter units and to a central telephone station, said microprocessor of each of said plurality of filter units being arranged to directly modulate on said telephone pair information from said metering means.

According to a third aspect of the invention there is provided a secure pay-for-use television distribution system comprising of cable, distribution network, distribution of signals from a central cable station to a plurality of subscriber premises, a plurality of filter units each mounted between the cable network and a subscriber premises to control the transmission of signals to the subscriber premises, a plurality of subscriber actuable control units each for mounting in a respective subscriber premises and connectable to the respective filter unit by a line for supplying control signals to the unit and for receiving therefrom the transmitted signals, said filter unit comprising inlet terminal means for connection to the cable network, outlet terminal means for connection to said line, means defining a first and a second circuit path between said inlet terminal means and said outlet terminal means, filter means in at least said first circuit path arrange to provide sufficient rejection loss to a TV channel signal so that the TV channel signal emitted from the first circuit path cannot generate a TV picture and arrange to provide a sufficiently low insertion loss to the TV channel signal so as not to interfere with the generation of a TV picture therefrom, and switching circuit means in said first and second circuit paths responsive to said control signals from said control unit to open and close alternate ones of said first and second circuit paths, said switching circuit means being arranged to open and close said first circuit path upstream and downstream of said filter means including a plurality of separate fibre-optic transmission systems each communicating from a central fibre-optic station to a respective one of a plurality of separate groups of said plurality of subscriber premises, means for transmitting to each of said groups a control channel providing a schedule of programs to be transmitted on the respective one of said fibre-optic transmission systems to the respective group, each of said filter units including means for decoding and transmitting to the subscriber premises signals on said fibre-optic transmission system and means for metering a time of use of said decoding means.

According to a fourth aspect of the invention there is provided a secure pay-for-use television distribution system comprising a cable distribution network arranged to distribute Subscription television and PFU television signals from a central cable station to a plurality of subscriber premises, a plurality of filter units each mounted between the cable network and a plurality of subscriber premises to control the transmission of said television signals to the subscriber premises, a plurality of subscriber actuable control units each for mounting in a respective subscriber premises and connectable to the respective filter unit by a line for supplying control signals to the unit and for receiving therefrom said television signals, said filter unit comprising inlet terminal means for connection to the cable network, means defining a first and a second circuit path from said inlet terminal means, filter means in at least said first circuit path arrange to provide sufficient rejection loss to said PFU television signals so that the PFU signals emitted from the first circuit path cannot generate a TV picture and arrange to provide a sufficiently low insertion loss to the Subscription television signals so as not to interfere with the generation of a TV picture therefrom, said second circuit path being arranged to transmit at least said PFU television signals, and said filter unit including for each subscriber line a first and a second amplifier each connected to a respective one of said first and second circuit paths and switching circuit means associated with said first and second circuit amplifiers responsive to said control signals from said control unit to open and close alternate ones of said first and second circuit paths.

This apparatus can permit programming to be sold to the subscriber by the month, by the program, and by the hour of any portion thereof Payment by the month is known as Subscription Television. Payment by the program is known as Pay-per-View. Payment by viewing time is known as Pay-for-Use (PFU) television. It also permits the Cable Operator to share revenues with independent programming suppliers sharing some portion of the cable TV distribution system.

This apparatus also can allow subscribers to sample premium programming being delivered prior to engagement of the metering process in order to encourage viewing of premium services. Unlike preview systems employed in many hotel Pay-per-View apparatus this preview feature is cheat-proof as it uses a capacitive charge memory to foil attempts to reset the timer that limits the duration of the preview sample permitted. It also incorporates fault detection circuitry to simplify troubleshooting and protect the power supply from over-load.

The specific apparatus described hereinafter was designed according to the following design objectives:
1. Maximize pay TV revenues
   maximize penetration
   little or no payment of non use -incorporate cheat-proof preview capabilities
2. Minimum cost for equipment, simplest installation.
   reuse existing subscriber's coaxial cable for signalling, power, and control purposes.
   minimum amount of circuitry for the basic configuration.
   simple installations should be able to be completed in 10 minutes.
   compatible with existing cable TV distribution facilities (minimum insertion loss, minimum generation of RFI and intermodulation distortion products).
   capacity to carry both the Premium TV Pay Services and the normal Cable TV Subscription Services on the existing cable distribution system be reliable and capable of withstanding short circuits on the interconnecting coaxial cable for long periods of time.

detect and signal an indication of a fault to the subscriber or installer.

exterior equipment capable of surviving severe environmental conditions.

basic apparatus must not require expensive pole installation.

3. Multiple Location Control to allow subscribers to access and monitor the system for any room in their home where there is a TV set using existing cabling.

4. Incorporation of a lockout control feature to prevent access to Premium Pay Programming by unauthorized individuals, such as children.

5. Permit tiering of different levels of Premium TV services at varying rates of cost.

6. Use field changeable filters to permit individual custom tiering of each subscribers Subscription and PFU channels.

7. Ability to allow Premium Programming to be turned ON and OFF by external apparatus such as timers and video recorders.

8. Integrate a Cable television broadcast system with a non-broadcast or limited broadcast, view on demand television delivery system. Provide apparatus that will allow the view on demand system to be constructed at the minimum per subscriber cost and permit sharing of revenues.

9. Provide the Cable Operator with the option of reading the meters remotely from a central location using as much existing facilities and equipment as possible in order to keep the cost at a minimum.

10. Provide Pay-per-View capabilities as an option.

The apparatus according to another specific embodiment can provide for the simultaneous multiple random access of any programming stored in a library of video programs. Such an invention together with development of extremely high capacity fibre optic transmission facilities allows for the development of video distribution libraries which can be accessed privately, or semi privately, by a subscriber whose residence is connected to the system. Subscribers will request a library program using the telephone system, the library operator will directly invoice the subscriber accordingly. The subscriber could have access to one or more such libraries. The apparatus for the reception of the signals at the subscribers premises is required to integrate with the existing cable television broadcast distribution facility. The apparatus embodied here is designed to meet the expected requirements. As the licensed cable operator may not have any interest in the demand programming library or the fibre-optic distribution system, yet be directly involved where the two systems interface, a need for revenue sharing is anticipated. An apparatus for the metering of the use of the video library system is provided for that purpose. The embodied apparatus is designed to economically meet these requirements.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principle of the present invention, in which:

DESCRIPTION OF THE DRAWINGS

FIG. 4 is a semiconductor switching system set-top control unit that is ideal for multi-point control. This unit allows for complete ON/OFF control from any location. With this unit a subscriber can turn the premium programming off from any location regardless of where the programming was previously turned on from.

In the drawings like characters of reference indicate corresponding parts in the different figures.

DESCRIPTION OF PREFERRED EMBODIMENTS

Figure 1:
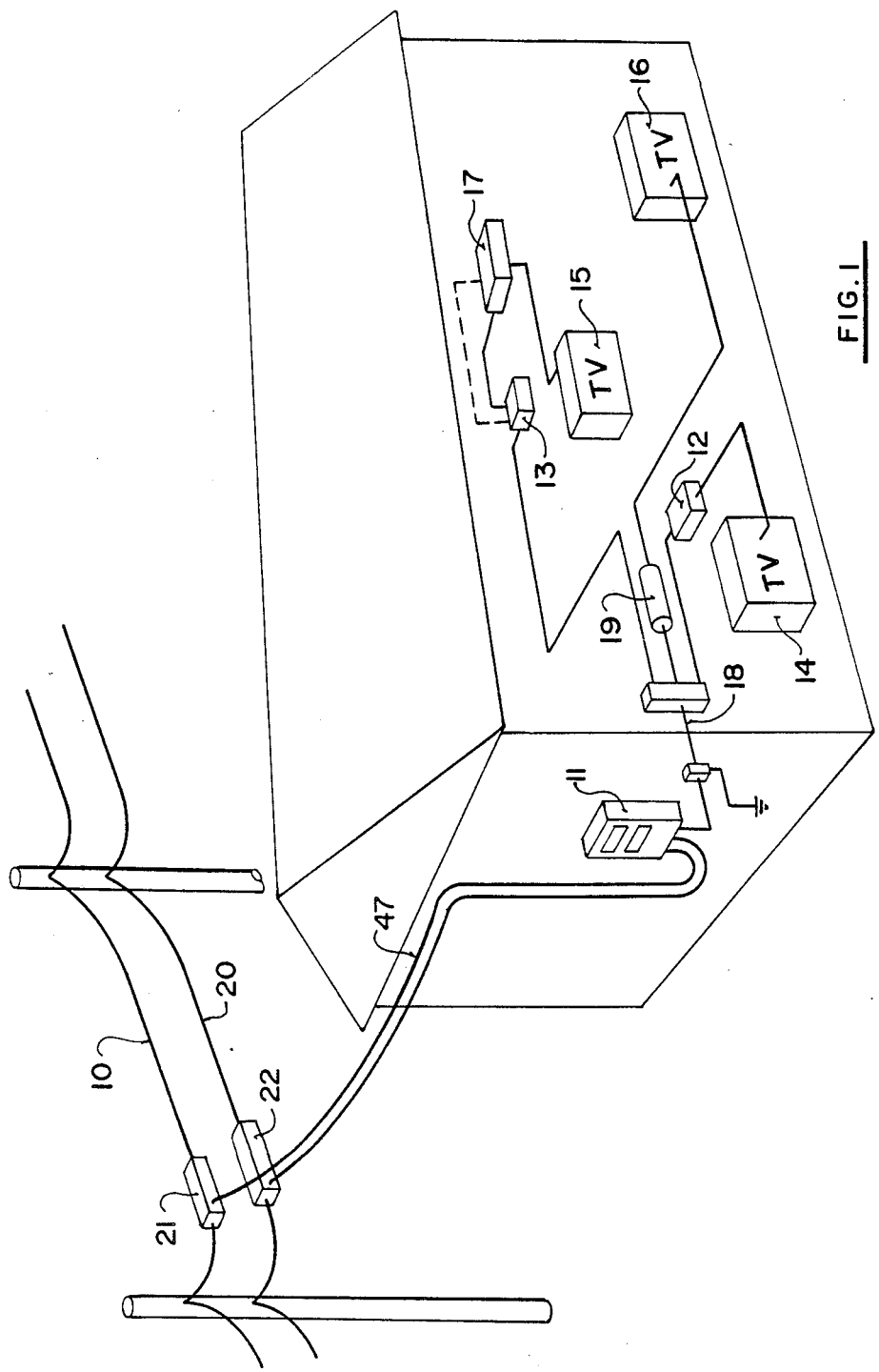
FIG. 1 is an overall illustration of the implementation of the pay-for-use broadcast television aspects of this invention.

With reference to FIG. 1, there is shown an overview of the general principles of this invention. The cable company broadcasts in unscrambled form television signals via a coaxial cable distribution system 10. These signals enter a secure external switching and control unit 11 where the Pay-per-Use signals are blocked when all set top units 12, 13 are switched off. Should that be the case only the Subscription Services are passed on to the subscriber's television receivers for viewing. Unit 12 cooperates with a TV 14 and unit 13 with a TV 15. A third TV is indicated at 16.

Should a subscriber using one of the Set-top Control Units 12, 13, which may include an associated timing apparatus 17 such as a video recorder shown connected to Television Receiver set 15, turn ON a D.C. current which flows to the external switching apparatus via the same coaxial cable that carries the television signals into the residence, that current will activate both the switching apparatus and the metering unit within the control unit 11.

When activated the switching apparatus routes the Pay-for-Use programming signals around a filter that previously blocked the Pay-for-Use programming and thus such signals are passed on for viewing via the same coaxial cable that is carrying the low voltage D.C. power to the external unit.

If the external Switching/Metering Unit 11 does not incorporate a preview feature described in detail hereinafter the D.C. power will simultaneously turn on the metering system. The metering system being calibrated to record either the time that the PFU signals are accessed or the charges to be billed for the time that the PFU programming is accessed. The metering system, which does not require D.C. power for meter reading, is a digital system using temperature stabilized circuitry. The metering system can be calibrated to register hours, fractions of hours, or minutes of useage.

When the set-up control unit is turned on, status display lights on all set-top units light to indicate that the pay-for-use premium television system is active.

Should the subscriber not wish to have a set top control unit installed near each television receiver a D.C. blocking device 19, which are commercially available, may be installed to protect sensitive equipment. TV Receiver 16 is so connected Such a receiver is still capable of receiving the PFU programming, however, the PFU programming must be turned on at a location where there is a set-top control unit.

A fibre optic line for supplying demand-TV system is indicated at 20 and a tap boxes on the line 22.

Figure 2:
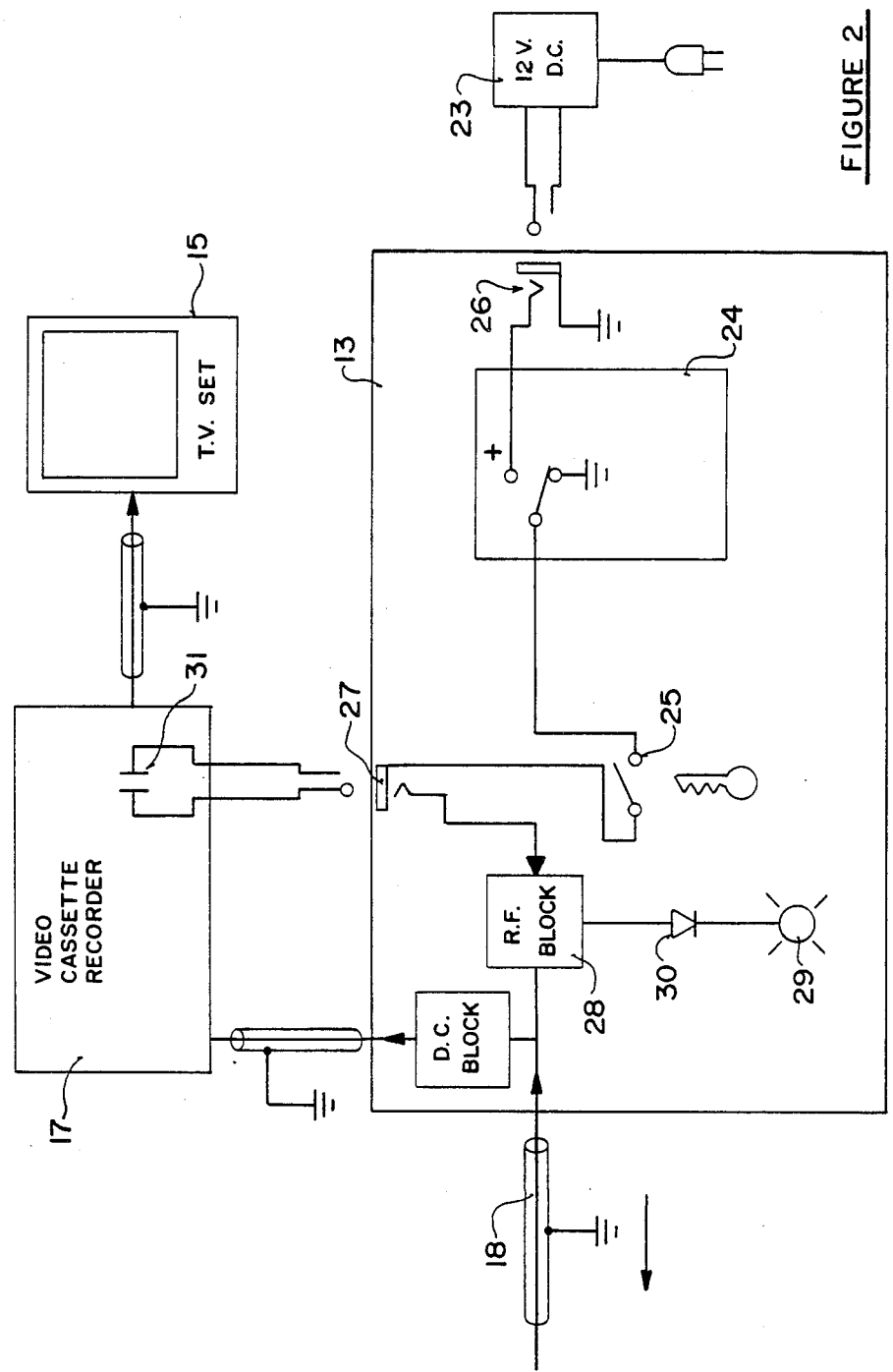
FIG. 2 shows the simplest configuration for the set-top control unit.

With reference now to FIG. 2, there is illustrated a television set-top control unit 12, 13 in accordance with the basic principles of this invention. D.C. power is supplied from a source separate from the unit and connected at jack 26. Should an ON Switch 24 be activated and a Parental Lock Switch 25 also be ON, D.C. current will flow through a normally closed Jack 27, and through the Radio Frequency Blocking circuit 28 to the External Switching and Control Unit 11 via the shown coaxial cable 18. This same D.C. source will also light an Activity Monitor 29 on the Set-Top Control Unit via a diode 30.

Note that should the auxiliary timing contacts 31 on the Video Cassette Recorder 17 be utilized, ON timing can be automatically controlled. So far no VCR manufacturer has forseen a need for timing contacts to control external apparatus.

Figure 3:
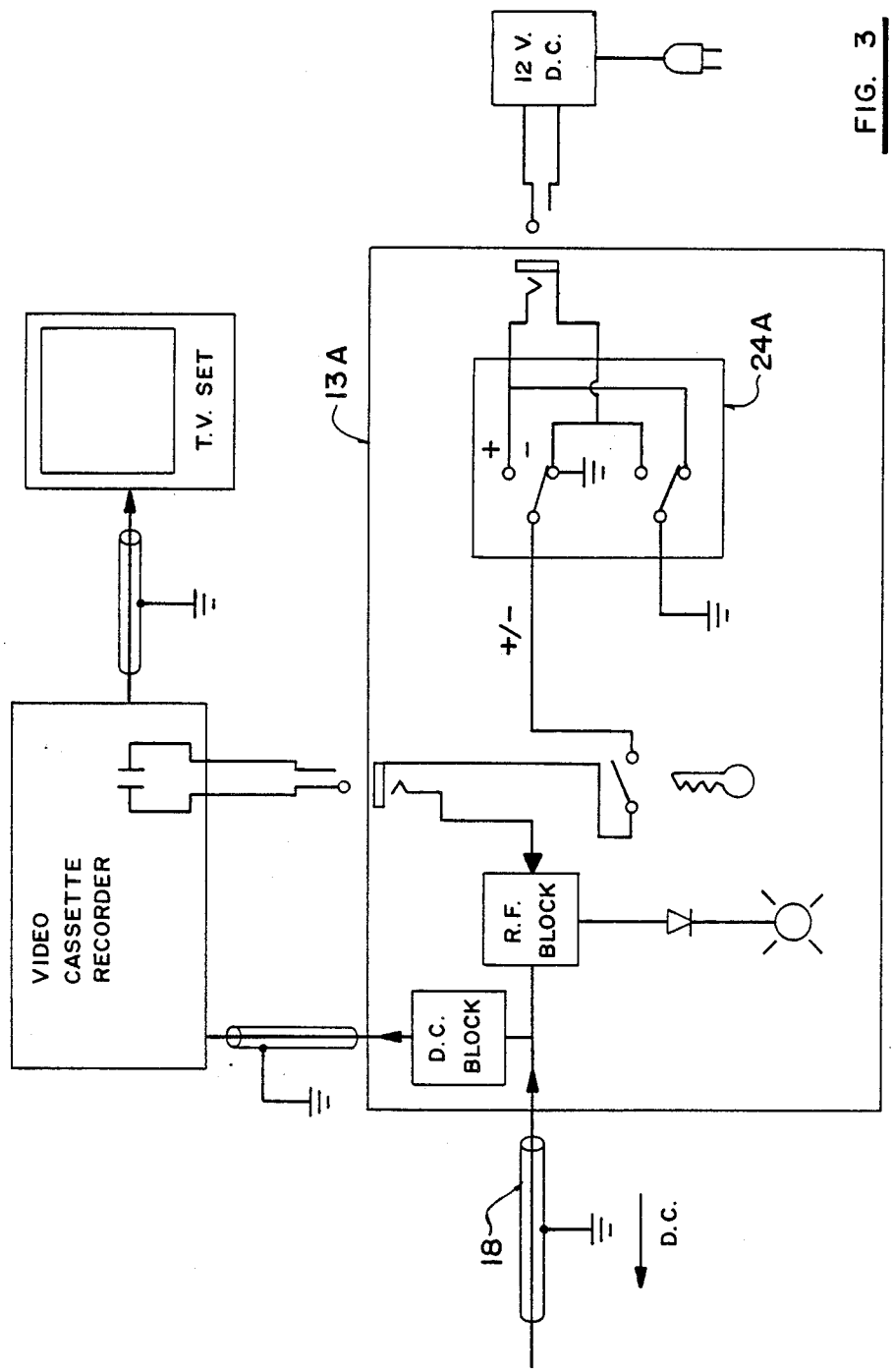
FIG. 3 is similar to FIG. 2 but utilizes both positive and negative D.C. signals. This unit is ideal for control of the semiconductor switching system.
Figure 6:
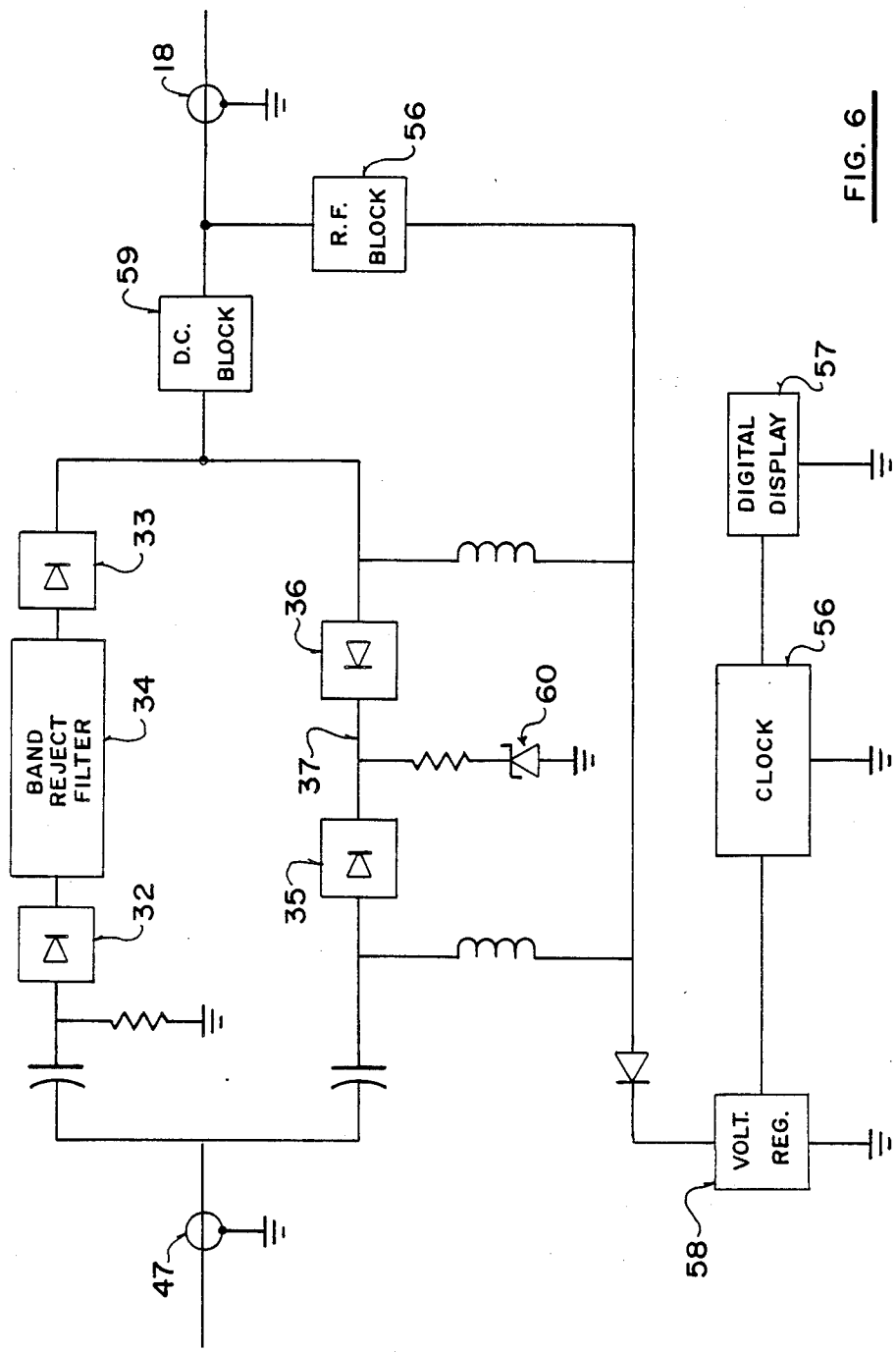
FIG. 6 shows the simplest implementation of the external unit using semiconductor switching.
Figure 13:
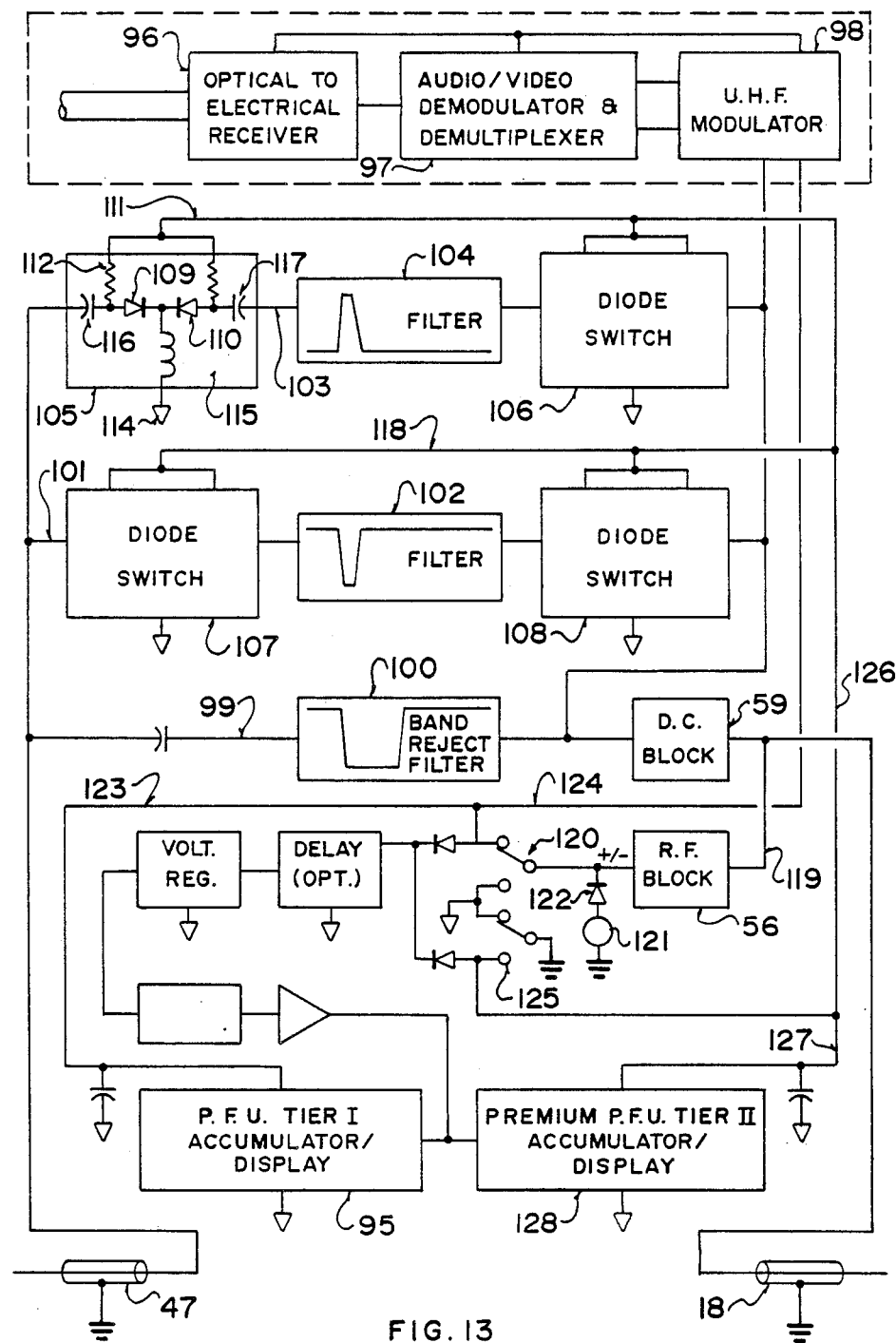
FIG. 13 illustrates the interfacing of the broadcast cable TV system in accordance with the principles of this invention and a demand programming fibreoptic distribution system.

FIG. 3 shows a very similar circuit for a Set-Top Control Unit 13. However, this Unit employs a modified ON switch 24A which is arranged as shown to supply a negative voltage to the coaxial cable when the Unit is turned OFF. This negative voltage can be used to improve the transmission performance of semiconductor switching circuits used in the External Switching and Metering Unit 11, or as a method of requesting a higher tier level of PFU programming. One example of a unit 11 is shown in FIG. 6 and uses the negative polarity to forward bias diodes 32 and 33 which switches in a Band Reject Filter 34 and to reverse bias diodes 35 and 36 to switch out a filter bypass circuit 37. In FIG. 13 the negative polarity is used to switch in a second level of Pay-for-Use tier of premium programming, while switching off the first tier of premium Pay-for-Use Programming.

Figure 4:
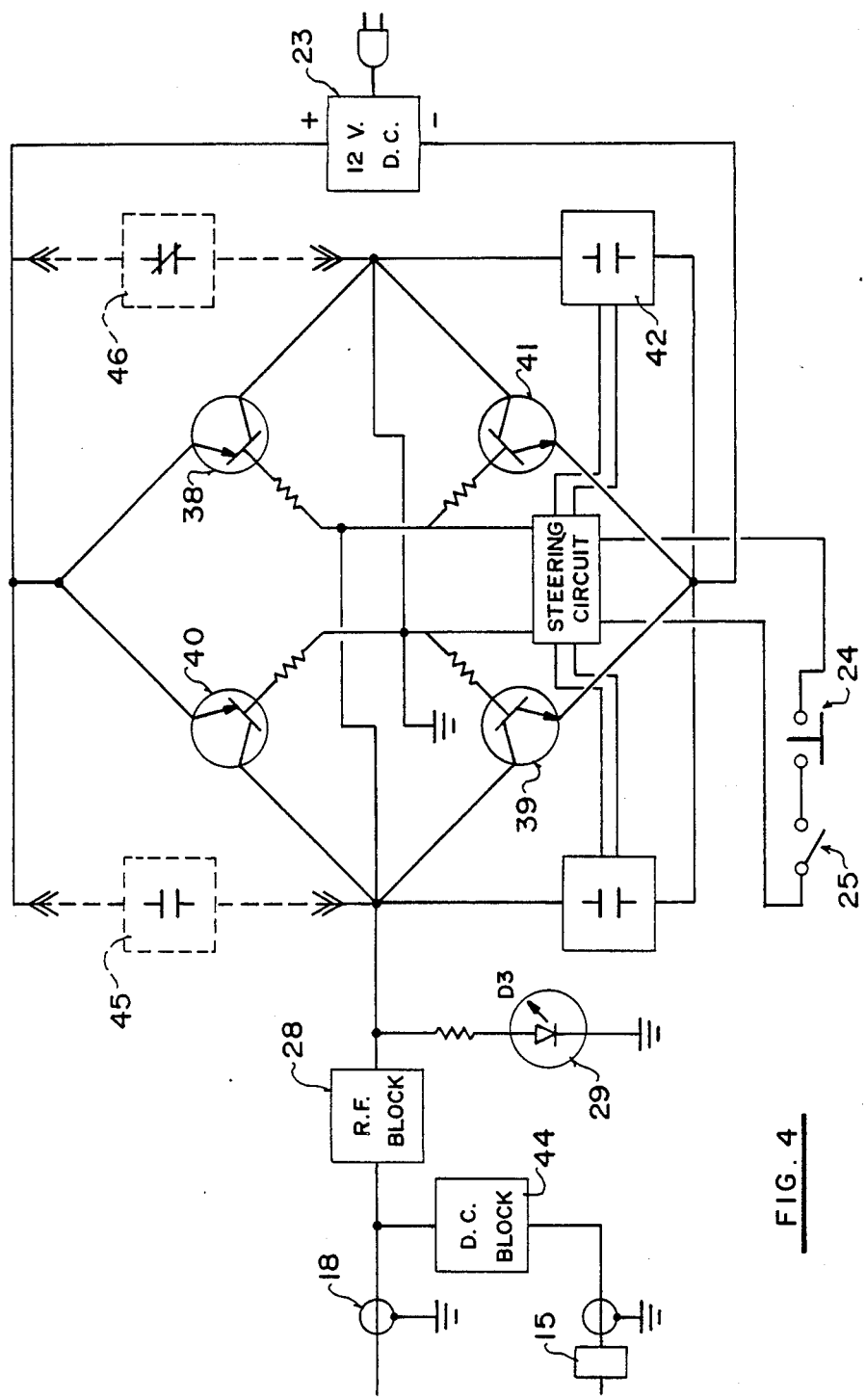

FIG. 4 illustrates an alternative arrangement of set-top unit 13B incorporating a unique combination of a bridge circuit and a bistable multivibrator circuit This circuit allows the subscriber to use any Set-top Unit to turn off the premium tier of programming regardless of which control unit was used to turn on the programming. This circuit is a condition following, reversing power supply circuit. For example, should a subscriber have two television receivers and one of these Set-top Units with each and should both be in the OFF condition, that is each is supplying a negative D.C. voltage to the centre conductor of the coaxial cable 18 (which is connected to the External Switching and Control Unit via a D.C. passing splitter), then in both units transistors 38 and 39 will be switched on and 40 and 41 will be switched off. Thus the negative side of the power supply will be connected to the centre conductor of the coax via transistor 39 and the positive side of the power supply to the outer conductor of the coax, or ground, via transistor 38. Should the subscriber have the keyed switch 25 of one unit closed, and momentarily close the switch 24 of the same set-top unit then the steering circuit will enable the closing of ON Momentary Contacts 42 which in turn will pull the collector of transistor 41 to the negative side of the Power Supply. The voltage across transistor 41 drop, and the base current to transistor 39 is reduced, the voltage across transistor 39 will rise as it begins to shut off, and the base current to transistor 41 will rise thus reinforcing the drop in the collector voltage of transistor 41. The circuit goes regenerative. Similarly the base current to transistor 40 will increase and the base current to transistor 38 will decrease. Transistors 40 and 41 switch ON, transistors 38 and 39 switch OFF. The centre conductor of this Unit is now connected to the positive side of the power supply and the outer conductor is now connected to the negative side. This switching of polarity will simultaneously influence any other Set-top Control Units connected in the subscribers home. The more positive voltage on transistor 39 will tend to turn ON transistor 41 and turn OFF transistor 38 as transistor 4; turns ON its collector voltage drops thus reducing the base current to transistor 39 which begins to turn OFF, similarly the base current to transistor 40 increases thus turning it on. To turn OFF the system switch 24 need only be momentarily closed, the steering circuit now enables the closing of the OFF contacts 43 and a similar pull down/push up action will occur forcing all units connected OFF.

The On and Off Momentary contacts can be electronic or electro-mechanical. The Light Emitting Diode 29 connected to the centre conductor of the coax on all units will light whenever a positive D.C. polarity is passed out to the External Switching and Control Unit. Thus the ON/OFF status of the system can be monitored from any room where a Set-top Control Unit resides.

A positive voltage on the centre conductor of the coax that carries the TV signals into the home turns on the PFU Premium TV bypass path around the Premium TV Filter and all TV receivers connected to the system in the home are then capable of viewing the Premium programming. The positive polarity signal will also energize the metering circuitry. Should all keyed lock off switches be turned off, then momentarily closing switch 24 on any unit will have no effect.

Resistance values in the circuit are chosen such that upon initial power up the circuit will regenerate into the OFF state.

The RF Block 28 prevents the radio frequencies that carry the TV signals from entering the Power Supply system and the DC Block 44 prevents D.C. power being passed to the TV Receivers or other related reception equipment.

Jacks are provided for connection to external timing control equipment such as Video Recorders, etc. The Auxiliary Contacts 45 and 46 located on such equipment, not provided in the unit, can be used to switch the premium programming ON and Off automatically at the desired time of day. The jacks used to access these external auxiliary contacts have normally OPEN contacts.

Figure 5:
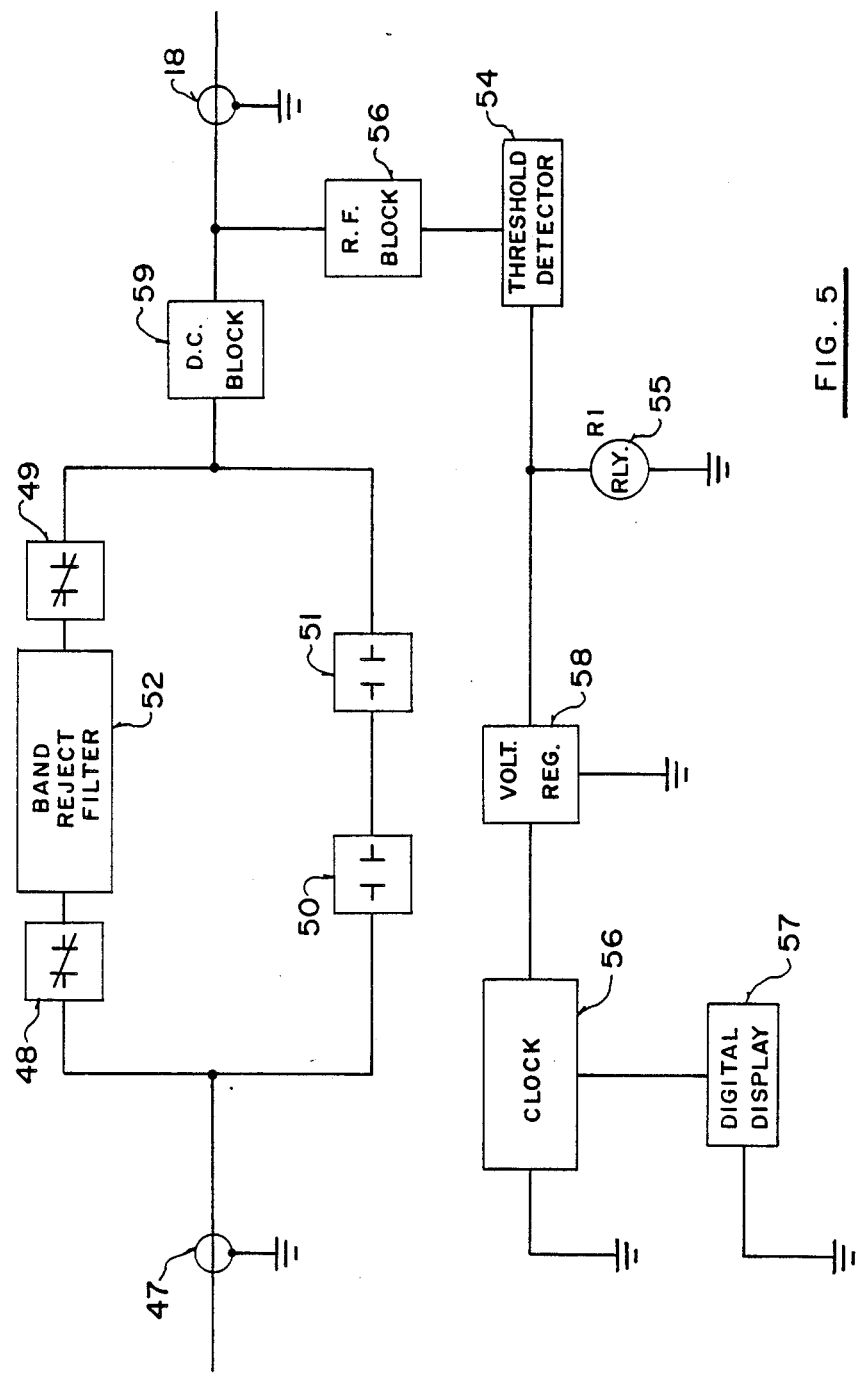
FIG. 5 shows the simplest implementation of the external unit using electro-mechanical switching.

FIG. 5 shows one embodiment of a simple electro-mechanically switched Exterior Switching and Metering Unit 11 connected on one side to the cable 47 to the tap box 21 and on the other side to the cable 18 to the set top unit. With no D.C. power on the coax 18 from the subscribers home an R.F. shielded relay 55 has contacts 48 and 49 in their normally closed state, and contacts 50 and 51 in their normally open state. Thus the band reject filter 52 which rejects the various channels of premium programming is switched IN with the filter by-pass path 53 switched OUT. Also no power is available to run the metering circuit. A threshold detection circuit 54 is used to foil tampering. A D.C. block 59 is positioned between the cable 18 and the filter circuit.

A DPDT relay is used for two reasons. First it increases the isolation between the Filtered Path and the Unfiltered Path. Second it eliminates the need for a splitter at the point where the incoming signal divides. It should be pointed out that Murphy (U.S. Pat. No. 3,989,877) uses a SPDT switch at the output end and a Splitter at the input end. As Murphy's apparatus requires the use of the splitter and SPDT switch the isolation is less (necessitating tee need for jamming) and the insertion loss will be 3.5 dB greater.

When the internal Set-to Control Unit is switched ON the D.C. signal from unit B is passed on to the relay 55 via an RF Blocking circuit 56 if the voltage level is sufficient to activate the threshold detector 54. The relay 55 is energized and the filter 52 now becomes switched OUT and the bypass path 53 switched IN. All programming including the Premium channels are now passed to the residence for viewing. D.C. power is now supplied to a temperature compensating clock generating circuit 56. Via a voltage regulator 58, the time that the unit is active counts up and the accumulated total is displayed on a read-out unit 57 for viewing by both the subscriber and meter-reading personnel. Both electronic and electro-mechanical displays can be used. The advantage of the electro-mechanical readout is that it requires no power for meter-reading purposes.

FIG. 6 shows an External Switching and Metering Unit that utilizes semi-conductor switching. Should no D.C. power be supplied from the subscribers residence no programming, neither regular subscription Cable TV programming or the PFU Premium Programming, will be passed on to the subscribers home. The unique diode switching circuitry insert up to 60 dB of insertion loss in both the Premium TV Reject Path and the Premium TV Bypass path. However when D.C. power of a negative polarity is supplied from the home, diode switching circuits 32 and 33 switch closed as they are now forward biased by the D.C. current. The very low forward A.C. resistance of the diodes allows the R.F. signals carrying the TV programming to now be switched through the Band Reject Filter 34. The Subscription Cable TV Programming is passed on for viewing but the PFU Premium Programming is blocked by the filter. When the subscriber switches the polarity of the D.C. power, diode switching circuits 32 and 33 are now switched OPEN as they are reversed biased, and switching circuits 35 and 36 become forward biased and switch CLOSED. All programming is now passed on for viewing as the Filter 34 has been bypassed. Also the metering system, consisting of a temperature compensated clock generator 56, a digital accumulator and display circuit 57, is activated. The metering circuit shown here is identical to that shown in FIG. 5.

In order for the diode switching apparatus to work, that is to maintain maximum isolation between the Filtered and Unfiltered paths a diode with minimum forward A.C. resistance and minimum unbiased capacitance must be employed. Several diodes can be connected in series to reduce the unbiased capacitance, however, the total forward resistance and Insertion Loss will increase. More than 4 diodes in series usually adds too much loss. In FIG. 6 diodes 35 and 36 would each be comprised of 2 diodes in series. The reason for diodes 35 and 36 being shown with opposing polarities is to maximize high signal level isolation when neither positive nor negative power is supplied from the subscriber's home. One diode product that is suitable for this application is Motorola's MBD101, this diode is a silicon hot-carrier diode (Schottky Barrier Diode) commonly used in UHF Mixer applications.

Most engineers would attempt to use PIN diodes for this application. They will NOT work as they have excessive unbiased capacitance. Should the subscriber disconnect the Power Supply on his Set-Top Unit he will receive no intelligent receive signal when the MBD101s are employed. When PIN diodes are employed a degraded but watchable picture will result without the metering system recording the useage. The security of the system would be compromised. It should be noted that Murphy in his reference to PIN diodes resolves the security problem by resorting to RF Jamming, an unsatisfactory solution. The danger of course being leakage back into the cable plant and interference with aeronautical and land mobile communications.

When an RF amplifier is added to the external Switching and Metering Unit, the addition of a bridge rectifier will enable the amplifier to operate using the D.C. power from the coaxial cable regardless of the polarity of the centre conductor being positive or negative. The incorporation of a simple low-cost single transistor common-emitter amplifier in the external unit, not shown, to provide slope adjustment and to offset cabling losses in the home will save the installer installation time and problems associated with having to bypass the D.C. around an amplifier installed in the home in the usual manner. When the amplifier is added D.C. power is required at the external unit at all times in order to ensure that both Subscription Services and the PFU Premium Services are amplified.

A zener diode 60 prohibits the Bypass Circuit from being turned on if the D.C. voltage is too low. The purpose is to prevent the PFU programming from being transmitted to the home without the meter running correctly. It is important to use threshold detection circuitry of this type to foil subscriber tampering. Similar threshold detection is indicated at 54 in FIG. 5.

Figure 6A:
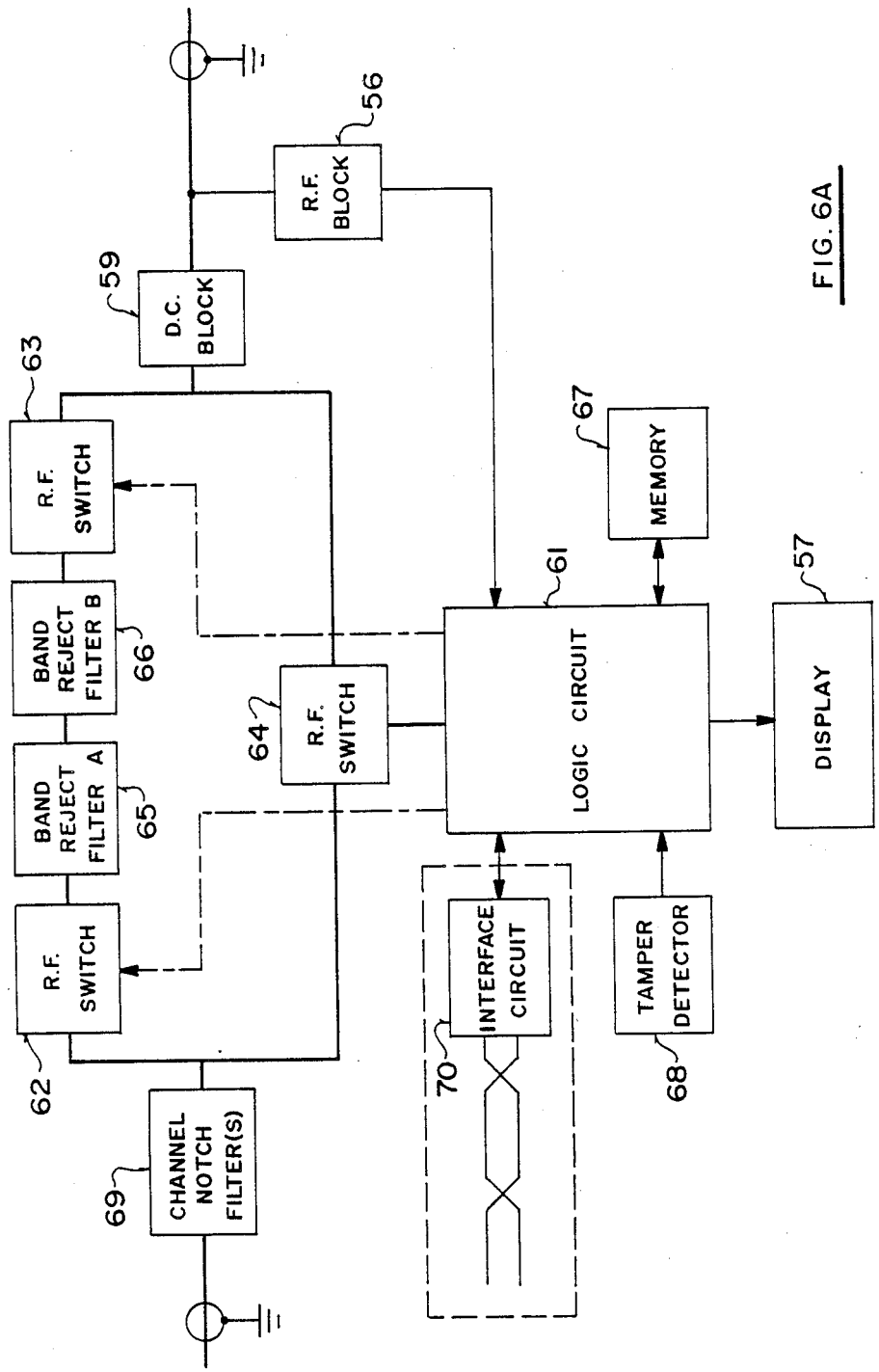
FIG. 6A is similar to FIG. 6 but illustrates how flatrate Subscription Services can be tiered, how PFU services can be tiered and incorporation of optional remote meter reading capabilities.

FIG. 6A shows a yet further embodiment of exterior metering and switching unit. This embodiment is similar to that of FIG. 6. It is however modified firstly in that it includes a logic circuit 61 which receives control and power signals through the RF Block 56 from the set-top unit. The logic circuit is arranged to control a first RF switch 62, a second RF switch 63 and a third RF switch 64. The first two switches are positioned in the circuit containing the band reject filters of which there are two in this embodiment indicated at 65 and 66 respectively.

The logic circuit is connected to a memory 67 and to a digital display 57 of the type shown in FIG. 6. A tamper detector 68 is also provided and connected to the logic circuit.

An additional filter or filters is provided at 69 and is connected upstream of the filters 65 and 66. The filter 69 is inserted to notch out non-switched Subscription Services in order to tier flat rate services or to eliminate PFU services that the subscriber does not wish to receive. The use of two separate filters at 65 and 66 allows non-adjacent bands of channels to be useage switched.

The logic circuit acts to carry out the following functions.
(a) It decodes the control signals transmitted from the set-top unit and operates the RF switches 62, 63 and 64 accordingly.
(b) It generates the clock signals for transmission to the accumulator/display unit 57.
(c) It operates a preview feature as explained hereinafter.
(d) It operates a remote meter reading information system through an interface 70 as will be explained hereinafter.

Figure 7:
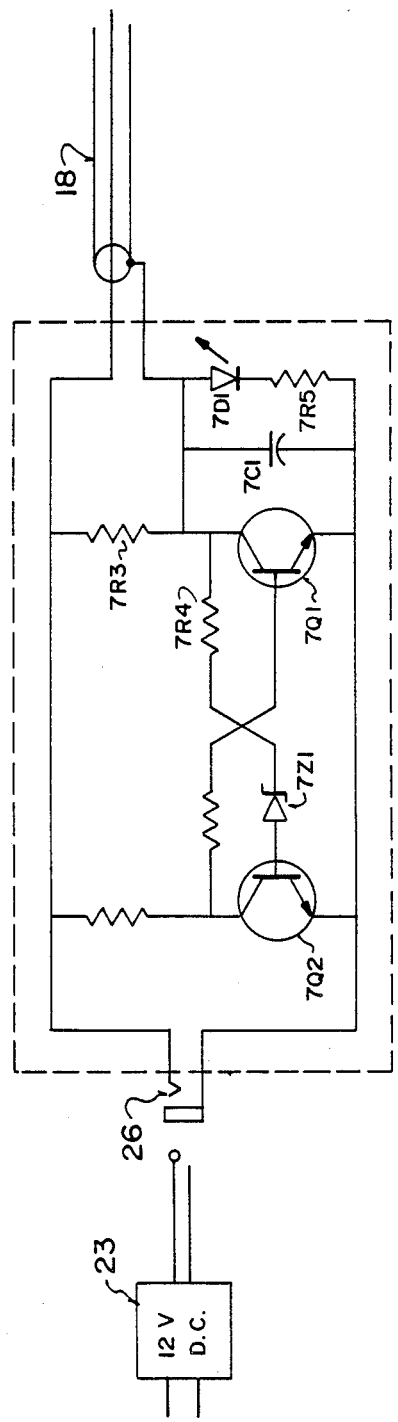
FIG. 7 shows a fault detection circuitry for use in the device of FIG. 6.

FIG. 7 illustrates a low-cost resetable electronic over-current circuit interrupter for use in the set-top unit of FIG. 2. This apparatus will reduce the current fed to the coaxial cable drastically if it detects an overload condition. If the coaxial cable load is a very low resistance (such as a short circuit) due to a cable fault when the plug-in power supply is connected to the power utility supply, 7R3 will be shorted out and sufficient voltage will be supplied via 7R4 that the zener diode 7Z1 will be turned on and 7Q2 subsequently driven into saturation: the collector-emitter voltage across 7Q2 will be low and 7Q1 will be held in the OFF state. If the short-circuit is cleared 7Q1 will remain OFF and 7Q2 ON.

If the fault has been cleared the circuit breaker can be reset by disconnecting the power supply and reconnecting it. When the power supply is disconnected 7C1 will discharge through 7R5. When the power supply is reconnected the base current through 7Q1 will rise more rapidly than that through 7Q2, as it takes time for 7C1 to charge. The circuit will regenerate to the state of 7Q1 ON and 7Q2 OFF. The circuit will remain in this state unless the output coaxial cable 18 is shorted. Should a momentary overload occur, other than a complete short circuit, 7C1 will begin to charge up through the load. As it takes time for the voltage across 7C1 to increase, 7Z1 will not immediately trip on. The duration of the delay can be varied by changing the value of 7C1, and/or the Zener voltage of 7Z1.

An overload of sufficient duration and low resistance will turn OFF 7Q1, and light the fault light LED 7D1, thus alerting the installer to check the cable connections, or the subscriber to phone the cable company and report the fault. This is a stable state and the circuit will remain i- this state until the fault is cleared and the circuit reset. In most cases it is expected that the fault will have occurred because the subscriber was rearranging the cable connections, perhaps connecting a TV unauthorized by the cable company. Verbal instructions will probably be adequate to correct most such occurrences.

Figure 8:
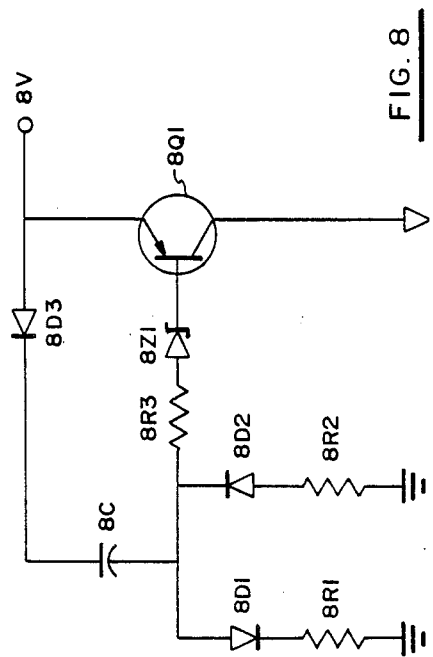
FIG. 8 shows a low cost cheat-proof preview circuit for use in the device of FIG. 6.

FIG. 8 shows a cheat-proof preview timer forming part of the logic circuit 61 of FIG. 6A. This circuit would typically be designed to allow the subscriber to view two minutes of PFU programming free of charge once every ten minutes. The free viewing duration and the repeatability duration can both be programmed by changing the values of 8R1 and 8R2 respectively. The circuit delays the application of power to the metering circuit.

If the circuit has been OFF for a sufficient duration to completely discharge the capacitor 8C, then upon application of the supply power indicated on 8V, 8C will charge through 8D1 and 8R1. When 8C reaches a sufficient threshold voltage the current flowing through 8R3, 8Z1 and 8Q1 base-emitter circuit will be adequate to drive 8Q1 to saturation thus energizing the metering circuit. From the time that the supply voltage 8V is first applied to the time that the zener circuit turns ON the subscriber will be able to view the PFU programming without the useage being recorded.

If the subscriber turns OFF his Set-Top Control Unit the supply voltage 8V is removed and 8C will discharge. If the switch is OFF for a sufficiently long period of time, in this example ten minutes, 8C will have had time to discharge through 8D2 and 8R2. The circuit will then have been reset and again the free viewing time will be available.

If the subscriber turns OFF the PFU programming using the switch on the Set-Top Control Unit for only one minute, and then turns it back ON, he will recover only a few seconds of free viewing time. If the subscriber turns OFF the PFU for five minutes he may recover one full minute of free programming.

Few subscribers would want to miss five minutes of programming in order to watch one minute for free.

The advantage of this apparatus is that it requires no power during the period that it is timing out. Unlike many previewing timers in use this circuit cannot be circumvented without the subscriber physically breaking into the secure enclosure containing the preview capacitor. A diode 8D3 in series with the supply voltage V prevents the subscriber from using a negative voltage to significantly speed up the discharge rate.

Figure 9:
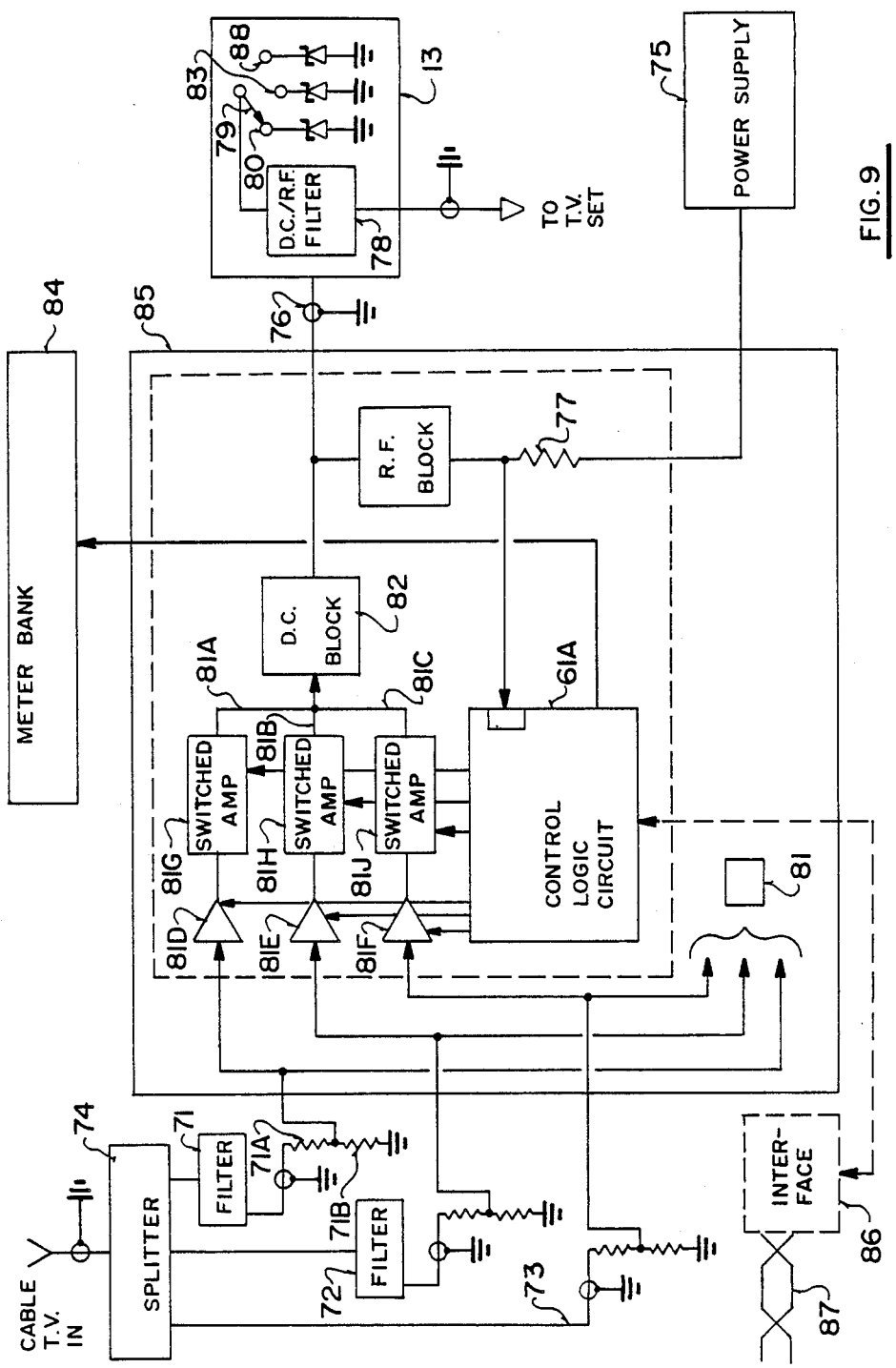
FIG. 9 shows a multi-tier apartment block system, complete with optional paired-cable interface for remote meter reading.

FIG. 9 shows a further embodiment of a Switching/Metering Unit for use with Multiple Family Dwelling Buildings (Apartment Complexes), or High Density Housing Districts. The Unit differs from the single residence unit of FIG. 6A in the following ways.
(a) Only one set of filters is required for all N subscriber residences. Thus a first filter 71, provides a signal free from a first tier of programming, a second filter 72 provides a signal free from a second tier at programming and a third circuit 73 provides all programming. A splitter is indicated at 74. From each of the filters 71, 72, 73, the signal is communicated to a respective pair of resistors 71A, 71B and is tapped between the resistors to feed to amplifier circuits 81. This technique provides the necessary impedance at the output from the filters while attenuating the signals by a factor of 10. The attenuation can be accepted by the presence of the amplifiers 81.
(b) Only one Power Supply 75 is required for all N subscribers. The Low Voltage/Current Power is delivered from the central Power Supply out over the N individual coaxial drop cables, one of which is indicated at 76, to each apartment or home. The current required to be fed to each home is considerably reduced, as its only job is to light an ON/OFF light and to generate an ON/OFF or Tier Level signal to the control logic circuit 61A. The current fed to the coaxial cable 76 can therefore be limited by the series resistor 77, no overcurrent protection is required.

(c) The Set-Top Control Units are considerably simpler. The DC/RF filter 78 rejects the low frequency or D.C. control signal and passes the radio frequency signal on to the TV receiver. It also rejects the R.F. signal and passes the control signal on to a control switch 79. In the example shown the OFF of Tier I condition may be a voltage of say 8 volts, PFU Tier II 6 volts and Tier III 4 volts. If the power supply puts out 12 volts, then in the example when the control switch is in position 80 the Zener Diode will pull down the voltage being applied to the Control Logic circuit 61A to 8 volts from 12.

(d) The Logic control circuit controls one of a plurality of switched amplifier circuits 81A, 81B, 81C, each associated with a respective signal from the circuits 71, 72, 73. Each circuit includes an amplifier 81D, 81E, 81F and a diode switch device of the type described herein and indicated at 81G, 81H, 81J. The logic control circuit switches on the respective amplifier by controlling the power supply thereto as schematically indicated. Each home or drop is associated with a separate set of such circuits indicated at 81K.

The Logic Circuit therefore decodes the above signal as a request for subscription programming only. The Control Circuit turns on the Switched Amplifier Circuit 81A and the signals with the premium PFU signals filtered out would be amplified and passed on to the subscribers residence via a D.C. Block 82. If a subscriber is unwilling to purchase: all of the flat-rated subscription services, then an additional filter(s) may be inserted at the output from Block 12, but not shown on the diagram, inside the secure enclosure. The subscribers monthly flat-rate payment would correspondingly be reduced.

Should the subscriber repositions the switch to position 83 the control voltage would pull-down to 4 volts, and the control circuit would turn-on switched amplifier circuit 81B. All subscription services and a tier of premium PFU channels would then be passed on to all TV receivers in the subscribers residence for viewing. The control unit 61A would also turn on the appropriate meter in the meter bank 84.

Should the subscriber wish to access additional PFU premium channels, a higher tier of offerings, there are a number of different configurations which can be used. In FIG. 9 with each subscribers control logic circuit 61A would be a switch 61B to be set by the installer, if set in one position only the less expensive first tier of PFU premium services (Tier 11) would be accessed by the subscriber, if set in the alternate position only the second tier of premium PFU service would be accessed (Tier 111) when the subscriber sets his control switch in position 88. For this configuration the meters would accumulate time and at the end of each month the cable operators billing computer would correctly translate time into money according to which tier of PFU service the subscriber is accessing.

A lower cost alternative would be to include only 2 switched amplifier circuits for each subscriber but use one switching circuit board 85 for those that want only the first tier (Tier II) of PFU services and a second switching circuit board for those that want the second tier of PFU services (Tier III).

Other alternatives would be to use two sets of meters, one for each PFU tier, or a single set of meters and 2 clock generators running at different rates, or where a microprocessor is used to run the control logic record the PFU tier useage in a set of non-volatile memories.

The requested Tier could be encoded in any electrical form, voltage (as described), current, capacitance, resistance, pulse width, frequency, etc.

The switched amplifier circuit 81A, 81B, 81C consists of a common emitter RF amplifier as well as the RF Diode Switching circuit referred to in FIG. 6. Both are simultaneously switched ON and OFF. This is necessary to further increase the Isolation between the signal paths, to overcome Tap Loss and to Slope Adjust the channels.

It should be noted that in Murphy (U.S. Pat. No. 3,989,887) it would be very difficult to make work in such an apartment block application as it is important to stop the RF jamming interference frequencies from leaking into the unfiltered signal path. Should a building have 100 apartments there would be 100 signal paths radiating interference. At least 45 dB of isolation between the jamming signals and the desired signals is required. Similarly the apparatus described herein requires that the 100 Unfiltered Paths not radiate into the 100 Filtered Paths, again 45 dB of isolation is the minimum requirement. The present Apparatus has an advantage over Murphy due to the superior Isolation of the switching system.

This centralized switch point apparatus is referred to as a PFU Switched-Star configuration as the Cable TV signals are transmitted to one central point and switched out over individual cables to a group of subscribers. Metering and control being centralized at the star point.

When the microprocessor is used meter reading can be simplified to simply dumping the useage data through a connector to a portable data acquisition memory. Alternatively the microprocessor can be programmed to transmit and receive FSK data by directly modulating and demodulating a Voice Frequency signal through an interface Circuit 86 on a paired cable 87. To keep the cost down the paired cable can be a spare telephone pair. Several hundred units are paralleled onto the spare pair, each has its own address and the microprocessor spills the useage data to a billing computer when polled. The protocol and frequencies utilized are non-standard to resist tampering. Logic 0 is in the 400–1000 Hz range and be 2 cycles in duration, Logic 1 is in the 1000–1500 Hz range and 3 cycles in duration. The paired cable interface includes a filter to roll off the high frequencies inherent in the square wave signal generated by the microprocessor modem. The Timer in pin on the microprocessor is used for the demodulation process.

The microprocessor based version shown in FIG. 9 can also incorporate Pay-per-View capabilities. Whenever the cost of a program changes the cost of the new PPV program is broadcast to all Switching/Metering Units, all individual residence units and all apartment block and high density housing units. The current cost of a specific PPV program being broadcast is stored in a non volatile memory and should the subscriber request that program the appropriate switched amplifier is activated and the program along with the subscription services is passed to the home. At the end of the month the PFU usage is read in hours and the PPV useage is also read in monetary value.

Alternatively the PPV useage can be recorded and stored in the non-volatile memory by program rather than monetary value. After transferring the useage to the central billing computer the computer would translate the useage into monetary value. It is important for PPV sporting events that the subscriber audience size is known. The PPV useage can then be transmitted to the central computer monthly or daily as required.

The subscriber need not request the Pay-per-View program using the telephone or any communication facility other than the coaxial cable linking the Set-Top Control Unit to the external Switching/Metering Unit. Costly two-way trunking amplifiers on the Cable TV distribution network are not required. Telephone trunking and switching circuit overloads due to massive simultaneous impulse purchasing will not occur.

An embodiment of the external switching and control unit suitable for a plurality of single family dwellings of the type shown in FIG. 9 is not illustrated. This apparatus differs from the apparatus shown in FIG. 1 in the following ways.
(a) The Switching/Metering Unit is located at the subscribers drop tap location and serves 4 or 8 single family dwelling homes.
(b) It is connected to the same spare telephone pair as 256 other similar units.
(c) It incorporates remote meter reading of both PFU and PPV useage.
(d) Turning on and off both the active tap amplifier and the switching network improves switching isolation.
(e) Centralized Power Supply using A.C. power transmitted on the CATV distribution cable.
(f) A microprocessor controls the switching, metering and communications functions: the microprocessor directly modulates and demodulates the remote meter reading data signals.
(g) Incorporates a tamper detection circuit to signal the central billing computer that unauthorized access to the circuitry has occurred.
(h) The unit does not reside on the exterior of the dwelling but either in the pedestal where the subscriber drop tap resides for buried distribution, or up on the strand which supports the aerial distribution cable.

The embodiment of the Switched-Star Tap Unit is very similar in function to the Switched-Star Multi-Family Dwelling Unit shown in FIG. 9, the fundamental difference is that the unit provides solely the use of remote meter reading, the Multi-Family has also a directly readable meter bank.

In a hotel environment, the apparatus can use either the splitter/drop tap arrangement or the star configuration described above.

The system may or may not use meters. The registration clerk may sell the guests the Premium Television Programming by the night by adding a surcharge to the room rate. Should the guest request the additional programming the guest is given a key to the Set-Top Control Unit. The key then allows the premium programming to be accessed. Alternatively the premium programming can be switched by a Switching and Control Unit located behind the TV receiver that records and transmits useage data on a daily basis to a central billing computer.

The data bypasses the tap using a low-pass filter. This apparatus is very similar to the remote meter reading apparatus previously described. This apparatus allows the programming to be sold by the hour.

Using the star arrangement, the premium programming can be sold on a flat rate per night basis or on a metered basis. If sold on a flat rate basis the programming is switched ON or OFF by the registration clerk using a nearby switch bank. If sold on a metered basis the useage registers on a bank of meters or a central billing computer. In both cases the Switching Unit is similar to the Switched Star Unit shown FIG. 9.

Figure 10:
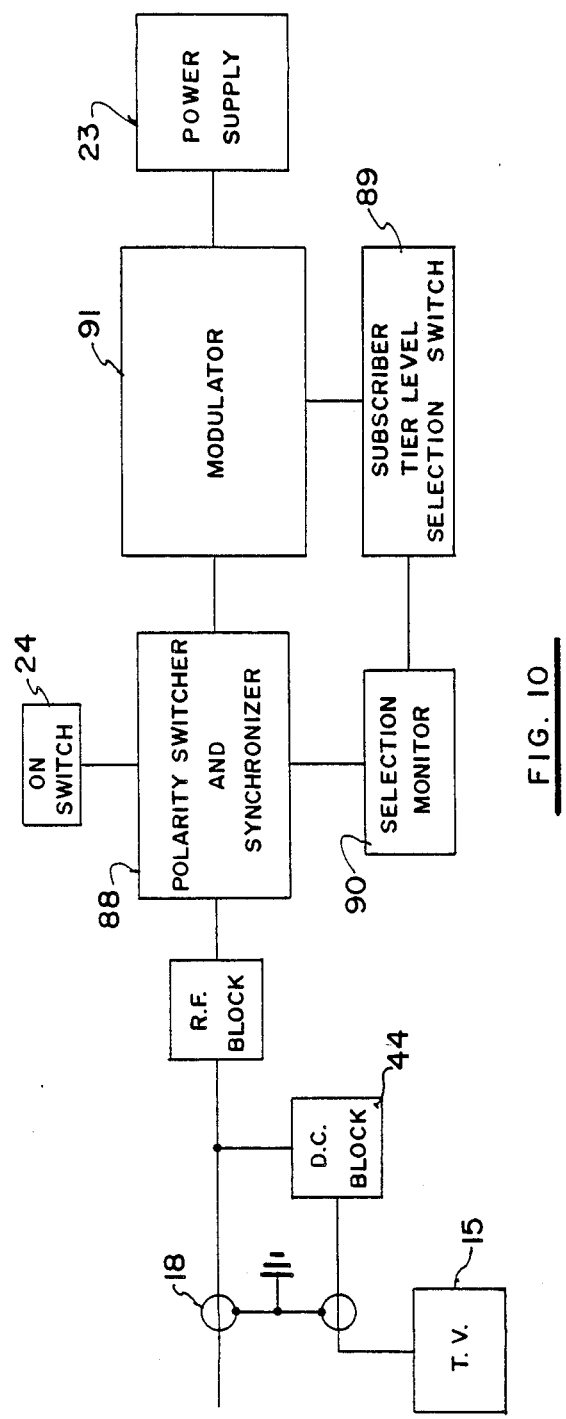
FIGS. 10 and 11 illustrate the implementation of a multitier premium TV pay-for-use system with FIG. 10a showing a set-top internal control unit and FIG. 11 one method of configuring a multi-tier switching network.

FIG. 10 shows a Master Set-Top Control Unit for a Multi-Tier System which is very similar to the device shown in FIG. 4. Only one of these units is provided in a subscribers residence: this unit allows the subscriber to access any or all of the PFU Premium Programming Services, additional Set-Top Control Units allow the user to access only the Tier I Premium Services. A Polarity Switching and Synchronizer circuit provided at 88 is similar to the Condition Follower circuit shown in FIG. 4. A subscriber Tier Level Selection switch 89 allows the user to select the Premium Programming Tier(s) that are desired and a Selection Monitor 90 displays the selection status.

A Modulator 91 impresses the selection onto the D.C. carrier provided by the Power Supply 23. This can be accomplished by adding a frequency (or amplitude or pulse width) modulated A.C. signal, or amplitude modulating the D.C. voltage or current, or by pulling the D.C. level low (or reversing its polarity) for a short duration, where the duration of the low level D.C. communicates the tier level selection.

Figure 11:
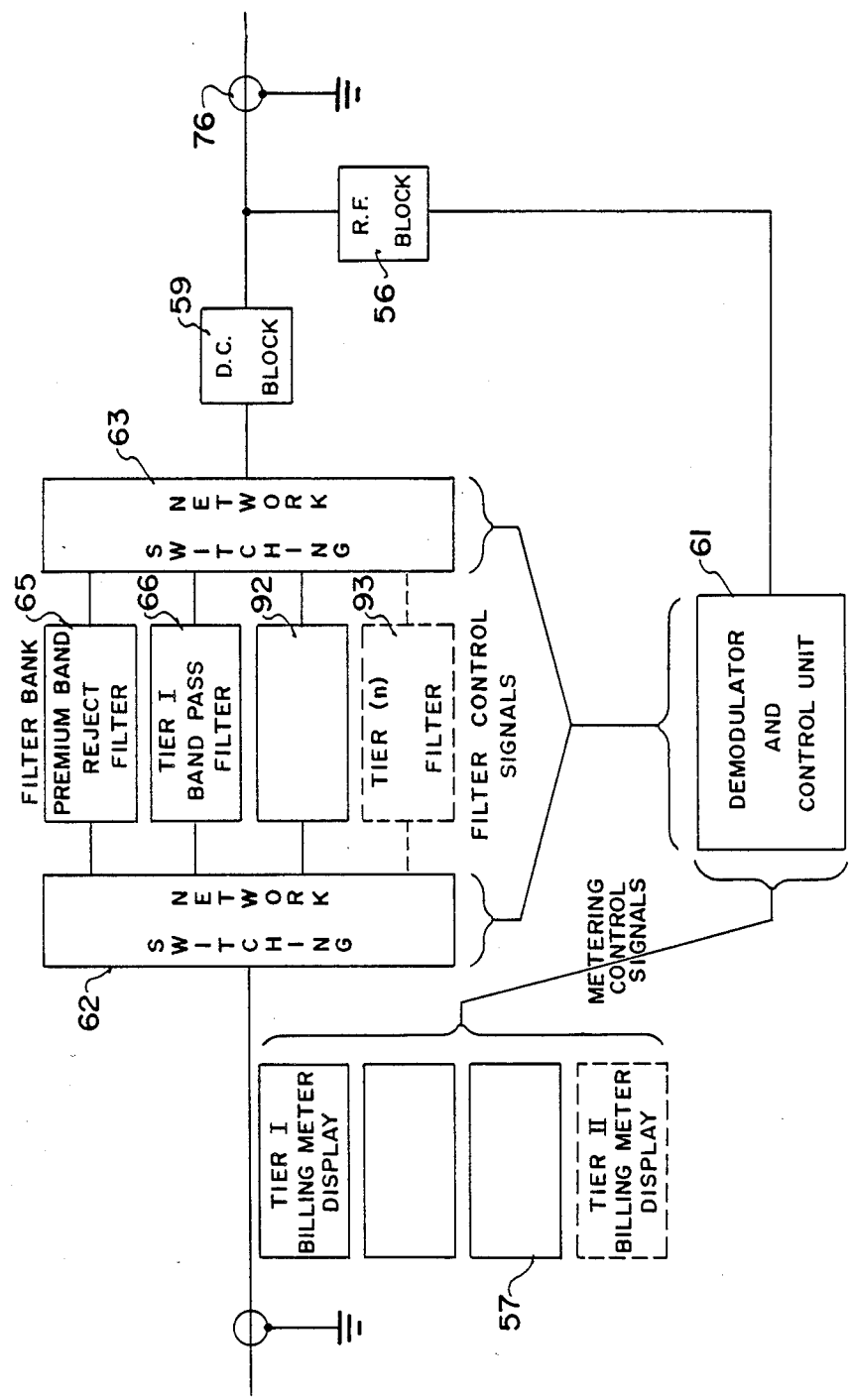

FIG. 11 shows a corresponding External Switching and Metering Unit for the Multi-Tier System of FIG. 10. The unit is very similar in construction to the unit shown in FIG. 6. Thus when the polarity of the D.C. power is negative only the Premium TV Reject Filter path 65 is switched IN all other filter paths 66, 92, 93 are switched OUT, when a positive D.C. power is detected by the Demodulator and Control Unit 61 the Tier I path 66 is also switched IN.

When the Demodulator and Control Unit detects modulation on the D.C. carrier it decodes the modulation and switches in the appropriate filter paths 92, 93. It also controls the operation of the billing meters 52. The billing meters are capable of being programmed to reflect different costs for the various tiers of Premium Programming Services. A separate meter for each tier may be employed or only two meters one for the Tier I services and a second for the higher tier services may be used. Where only two meters are used the Control Unit is programmed to regulate the billing meter for the Tier II and higher programming services such that the separate rate for each Tier is appropriately accounted for.

Figure 12:
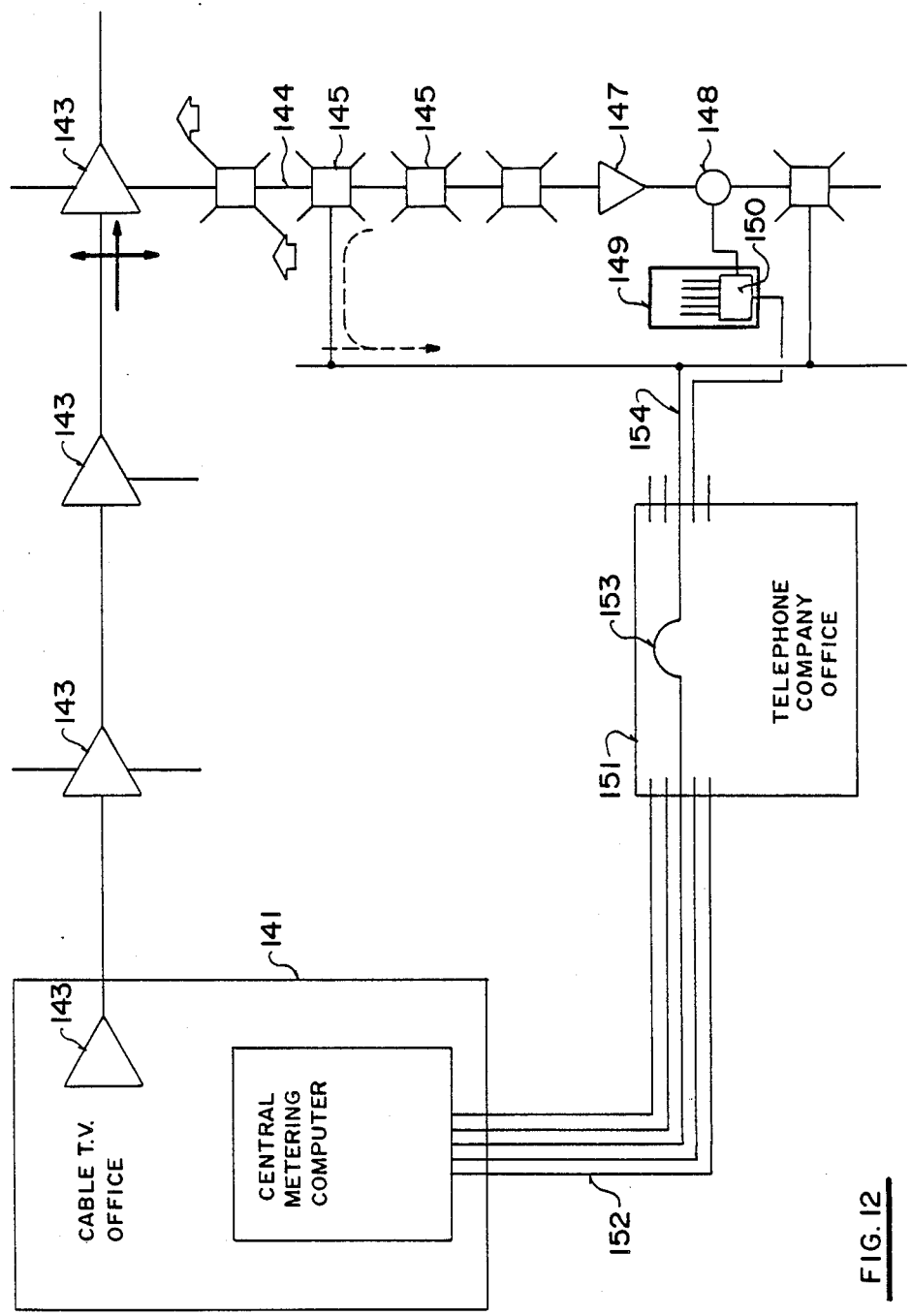
FIG. 12 illustrates a central metering system.

FIG. 12 provides a general overview of a cable network including a central metering system.

The total system comprises a central cable TV office 141 which supplies cable TV signals along a cable TV trunk 142 including trunk-bridger amplifiers 143 of a conventional construction. One line of the trunk is indicated at 144 and includes a plurality of the switched star External ControlUnits indicated at 145 and generally of the type illustrated in FIG. 9. Each Control Unit 145 provides a plurality of drops one of which is indicated to a single family dwelling unit at 146. An extender amplifier is indicated at 147. A tap for feeding an apartment block is indicated at 148 with the apartment blocks schematically indicated at 149. A Unit of the type illustrated in FIG. 6 is indicated at 150.

The cable TV office 141 also communicates with a telephone company office indicated at 151 via a plurality of telephone pairs indicated at 152. A patch pair in the telephone office is indicated at 153 which communicates with a spare telephone pair indicated at 154 which is connected to a plurality of the external units including the unit 150 and a plurality of the units 144. The system thus uses a spare telephone paired cable as a common bus to connect up to 256 subscribers per pair to the cable TV office 141.

FIG. 13 shows an exterior Control Unit similar to that of FIG. 6 but with two Tiers of Premium Pay-for-Use Television integrated with a fibre-optic Programming-On-Demand random access library system. When a positive D.C. polarity is delivered from the Set-Top Control Unit, power is supplied to a Time Clock Power Supply indicated at 94, a Tier I Accumulator/ Display Power Supply 95 and the Fibre Optic Receiver 95, an Audio/Video Demultiplexor and Demodulator Subunit 97 and a UHF Modulator Subunit 98. The video and audio signals which are either frequency division multiplexed or time division multiplexed over a channel unique to the subscribers address via the fibre optic distribution system are converted from a light signal to electrical signals and demultiplexed and demodulated into separate audio and video signals, they are subsequently modulated onto an unused television channel for subsequent transmission into the subscribers home.

The subscriber must pay the video library operator directly for the programming accessed, the utility that owns the fibre-optic distribution system (which may or may not be the cable TV operator) for the utilization of the fibre channel, and for the use of the Exterior Interfacing Unit and the Interior Control Unit.

The embodiment of FIG. 13 further includes the filtering and switching network of the type generally shown previously in FIG. 6. Specifically a first circuit path 99 includes a band reject filter 100 which is arranged to filter out the premium TV channels leaving the basic cable channel on the line 99. A second line 101 includes a notch filter 102 which filters out a specific premium channel to provide a PFU series of channels of a Tier II Level. A third line 103 is arranged to allow all Tv channels to pass through so that a premium generally higher priced channel is also available in addition to the Tier II Level. The filter 104 may allow through all channels or may be arranged to allow through only the premium high cost channel.

The lines 101 and 103 are switched as previously described by the provision on the line of a positive biasing voltage for a plurality of diodes which is 105, 106, 107, 108 generally of the same type as previously described.

A specific diode switch is shown in more detail at 105 and comprises a pair of diodes 109, 110 which can be biased by a direct voltage applied on a line 111 which passes through resistors 112 and 113 to ground at 114 through the diodes and through an inductance 115. Capacitors 116 and 117 block the passage of the D.C. current from the line 111 to the cable system. Thus the biasing of the diodes 109 and 110 allow the diode switch 105 to pass the signal along the line 103 through the filter 104 and through the switch 106 to the cable 18 connected to the control unit. The switches 107 and 108 operate in similar manner by a positive voltage generated on a line 118.

Control of the switching of the diode switches 105, 106, 107, 108 is provided by the supply of either positive or negative voltage on the cable 18. On supply of a positive voltage at the cable 18 from the Control Unit, this positive voltage is transmitted along a line 119 through the RF Block 56 to the poles of a relay 120. The relay is actuated by a relay switch 121 downstream of a reverse bias diode 122 so it is only actuated on provision of a negative voltage on the line 119. Thus when a positive voltage is on the line 119, the relay takes up the position shown in FIG. 13 so that positive voltage is transmitted to a point 123 which is used to power the accumulator/display unit 95. In addition the positive voltage is transmitted through a line 124 to the line 118 and to the fibre-optic cable programming system and in particular the modulator 98. Thus the provision of the positive voltage from the Control Unit allows signals to pass along the line 101 and from the fibre-optic system as can be selected by the user at his TV set.

The Tier I accumulated display unit 95 thus can be set to a lower value per unit time so that the cable operator can collect a payment for use of the basic system in which the demand programming on the fibre-optic cable is paid for separately as explained hereinafter or wherein the cheaper Tier I programs are used.

When a negative voltage is supplied on the cable 18 from the Control Unit, the relay switch 121 actuates the contacts 120 to switch to the opposite position from that shown in FIG. 13. The D.C. Block 59 is arranged to replace the actual ground of the cable 18 with an effective ground of the unit so that the effective ground becomes an apparent positive voltage supply applied at the contact 125 of the contacts 120. This positive voltage passes along a line 126 to be applied to the line 111 of the diode switches 105 and 106 thus actuating those diode switches and allowing programming to pass through the filter 104 which is/or includes the high cost premium channel The positive voltage at terminal 125 is also transmitted to point 127 which acts to power the premium Tier II accumulator/display unit indicated at 128.

The diodes 109, 110 provide a very low forward A.C. resistance (approx. 1 ohm) and very low unbiased capacitance (approx. 1 pF). The connection of two diodes in series further reduces the capacitance. The diode switches 105 and 106 are provided on the upstream and downstream side of the filter so as to isolate the downstream side of the three lines 99, 101, 103. Thus there is no possibility of even deteriorated signals leaking from one line to another thus providing an unmetered albeit degrading signal which can be watched by the subscriber.

The filters and switching circuitry are arranged so that they have a high rejection loss (50 +dB), low insertion lost to out of band channels (0.3 dB) and are temperature stable. Thus the circuitry has sufficient insertion lost to a filtered channel so as to render a filter channel unuseable should the signal level deliver to the subscriber's home be typical for cable TV system (less than 6,000 uV). The filtered programming remains unuseable even when the subscriber disconnects the power supply to the apparatus. The circuit does not require the use of a splitter in order to separate the filtered path from the unfiltered path and has an insertion loss of less than 3 dB. Where an amplifier is used it again cancels all system losses and compensates for any slope on the received channels.

While the device as shown provides the filters only on the switched parallel paths, it is possible to install filters on the unswitched path upstream of the switched paths so that a subscriber can tailor the system to any required useage pattern, for example totally eliminating an unrequired channel.

Figure 14:
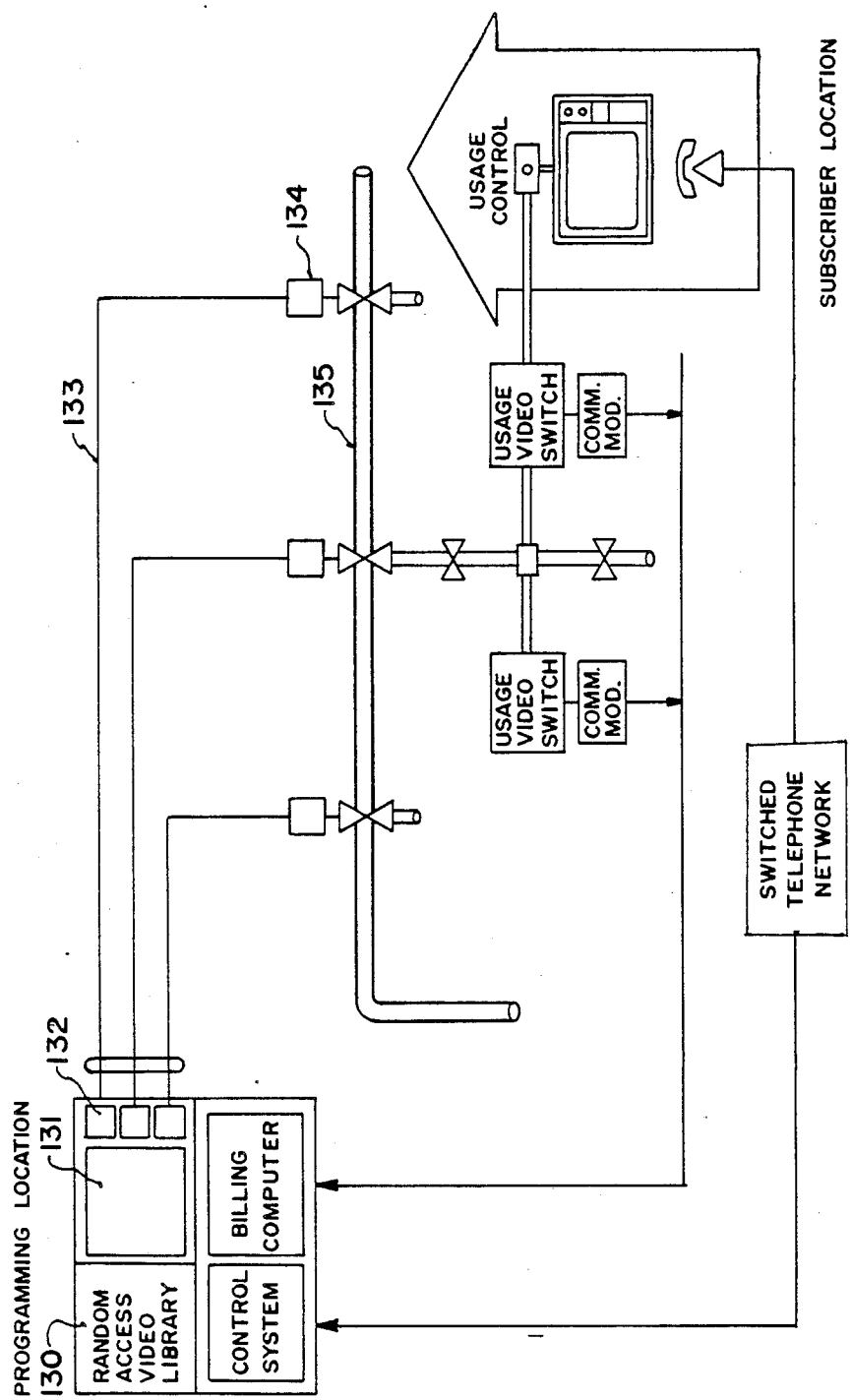
FIG. 14 illustrates apparatus for economically integrating demand programming technology with existing coaxial cable television distribution apparatus. The system is very economical as it utilizes a kind of Video Party-Line.

FIG. 14 shows a configuration of the apparatus that permits demand programming to be integrated with an existing coaxial cable distribution system economically. As it is costly to provide a unique private television channel to each home a cost effective alternative that permits the delivery of programming upon the request of the subscriber is required. Subscribers wishing to use the system tune in a continuously available Activity Schedule provided on one of the transmitted channels. They then make a decision as to whether they wish to view one of the scheduled programs shown or order their own program. When the Activity Schedule includes an empty channel, if the user wishes to order a program it could be scheduled for that time and channel. Programs that are shown have been requested by other subscribers living in the same neighborhood. If one of these programs is accessed only a system useage charge will be billed to the subscriber, if the user orders a program, through the placing of a telephone call, the operator of the programming library charges the user an additional charge.

Programs are transmitted along a fibre-optic cable from a programming library 130. One fibre feeds each neighborhood. The programs are modulated onto a band of channels acceptable to TV sets using commonly available modulators 131 The broadband signal is directly modulated onto the fibre-optic cable 133. The fibre cable is overbuilt along the existing cable TV trunking route 135. At the point where a bridger amplifier taps off the cable TV to feed a neiqhbourhood, the fibre feeding that neighborhood is terminated at a demodulator 134 and the programming library signals are demodulated, amplified and combined with the cable TV signals distributed to the neighborhood from the cable TV trunking. The demand programming channels do not interfere with the Cable TV channels on cable 135 as they are separated by frequency.

The exterior Switching and Metering Unit records the useage of both the PFU premium TV signals and the programming library service, the same meter or separate meters could be used.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

We claim:

1. A secure pay-for use television distribution system comprising a cable distribution network arranged to distribute Subscription television and pay-for-use television from a central cable station to a plurality of subscriber premises, a plurality of filter units each mounted in a first housing between the cable network and a describer premises to control the transmission of said television signals to the subscriber the transmission of said television signals to the subscriber premises, a plurality of subscriber actuable control units each mounted in a second housing separate from the first housing for positioning in a respective subscriber premises and connectable to the respective filter units by a cable and including power supply means for supplying DC voltage control signals to the respective filter unit and for receiving therefrom said television signals, each said filter unit comprising inlet terminal means for connection to the cable network, outlet terminal means for connection to said line, means defining a first and a second circuit path between said inlet terminal means and said outlet terminal means, a broadband band rejection filter in at least said first circuit path arranged to provide sufficient rejection loss to said pay-for-use television signals so that the pay-for-use signals emitted from the first circuit path cannot generate a TV picture and arranged to provide a sufficiently low insertion loss to the Subscription television signals so as not to interfere with the generation of a TV picture therefrom, said second circuit path being arranged to transmit at least said pay-for-use television signals, switching circuit means including a plurality of Schottky barrier diodes in said first and second circuit paths responsive to said DC voltage control signals from said control unit to open and close alternate ones of said first and second circuit paths, said switching circuit means being arranged to open and close said first circuit path on a side of said filter adjacent said inlet terminal means and on a side of said filter adjacent said outlet terminal means, said switching circuit means including voltage threshold means defining a first minimum voltage value of said DC Voltage control signal at which switching closed of said second circuit path will occur and metering means mounted in said first housing for metering a period of time during which said second circuit path is switched closed, comprising a metering clock arranged to meter time at an accurate, constant, independent rate in response to application to the filter unit of a DC Voltage control signal greater than a second minimum voltage value which is less than the first minimum voltage value, said accumulator means for storing a record of the metered time, which is arranged to maintain said record during interruption of the DC Voltage control signal.

2. The invention according to claim 1 wherein said power supply means is arranged to supply a positive D.C. voltage control signal and a negative D.C. voltage control signal such that supply of one of said positive voltage and said negative voltage actuates said switching circuit means to close said first circuit path and to open said second circuit path, to inhibit transmission of said pay-for-use television signals while allowing transmission of said Subscription television signals and supply of the other of said positive and negative voltages actuates said switching circuit means to close said second circuit path and to open said first circuit path to allow transmission of said pay-for-use television signal.

3. The invention according to claim 1 wherein said subscriber actuable control unit includes a security switch actuable to disable transmission of said pay-for-use television signals.

4. The invention according to claim 1 wherein said subscriber actuable control unit includes switch means actuable by control signals form a VCR timer.

5. The invention according to claim 1 wherein said switching circuit means includes first diode means arranged in said first circuit path to pass current in one direction and includes a second diode means arranged in said second circuit path to pass current in the opposite direction, said subscriber actuable control unit is arranged to supply to said filter unit selectively control signals comprising respectively a positive D.C. voltage and a negative D.C. voltage whereby one of said positive and a negative voltages biases said first diode means to transmit RF signals and the other of said voltages biases said second diode means to transmit RF signals while biasing said first diode means to inhibit RF signals.

6. The invention according to claim 5 wherein each of said first and second diode means comprises a first and a second diode arranged in series in the respective circuit path and in opposed bias direction, a ground connection intermediate said diodes and a means providing positive voltage biasing to the diodes on sides thereof remote from said ground connection.

7. The invention according to claim 6 wherein said voltage threshold means comprises a zener diode in said ground connection such that the diodes are forced into conduction only when the positive voltage exceeds a predetermined minimum.

8. The invention according to claim 1 including delay circuit means arranged to actuate said metering means only after a predetermined time delay so as to allow previewing by the subscriber of the television channel signal.

9. The invention according to claim 8 wherein said delay circuit means includes capacitor means and means for charging said capacitor means at a predetermined charging rate from power supplied to said switching circuit means, means for actuating said metering means when said capacitor means is fully charged and means for discharging said capacitor once said power is removed at a rate slower than said charging rate.

10. The invention according to claim 1 including transistor controlled automatically resettable circuit breaker means for disconnecting said D.C. voltage control signal from said line in the event of an overload.

11. The invention according to claim 1 wherein said metering means a record of time of use of at least one of said first and second of each of said filter units includes microprocessor means responsive to said control signals and wherein there is provided a single pair of telephone wires connected in parallel to a plurality of said filter units and to a central telephone station, said microprocessor of each of said plurality of filter units being arranged to transmit on said telephone pair information from the respective metering means.

12. The invention according to claim 1 wherein the cable distribution network comprises said cable distribution network comprising a cable distribution trunking having a plurality of amplifier and a plurality of drop-off taps each of which is associated with a respective one of a plurality of groups of said plurality of subscribers premises and at each of which signals for a respective group are extracted from the trunking, and a fibre-optic distribution network including a central fibre-optic station, a plurality of separate fibre-optic transmission fibres each communicating from said central fibre-optic station to a respective one of said plurality of separate groups of said plurality of subscriber premises, said central station including a plurality of transmitting and modulating means each associated with a respective one of the fibres each of said transmitting and modulating means being arranged to transmit means for to the respective one of said groups a plurality of channels including a control channel providing a schedule of programs to be transmitted on the plurality of channels and to modulate the channels onto a band of channels separated by frequency in such a manner that the signals on each of channels are compatible with the television signals at the subscribers premises, and a plurality of translating units each associated with a respective one of the drop-off taps and each arranged to translate the signals of said channels from fibre-optic communication on said fibre to communication on said drop-off tap, said means at said central station for entering into a time slot on one of said plurality of channels and onto said schedule on said control channel a program requested by a subscriber and for recording to an account of the subscriber a fee for said program.

13. A secure pay-for-use television distribution system comprising a cable distribution network arranged to distribute subscription television and pay-for-use (PFU) television signals from a central cable station to a plurality of subscriber premises, a plurality of filter units each mounted between the cable network and a subscriber premises to control the transmission of signals to the subscriber premises, a plurality of subscriber actuable control units each for mounting in a respective subscriber premises and connectable to the respective filter unit by a cable and including a power supply means for supplying DC Voltage control signals to the respective filter unit and for receiving therefrom the transmitted signals, each said filter unit comprising inlet terminal means for connection to the cable network, outlet terminal means for connection to said line, means defining a first and a second circuit path between said inlet terminal means and said outlet terminal means, filter means in at least said first circuit path arranged to provide sufficient rejection loss to a TV channel signal so that the TV channel signal emitted from the first circuit path cannot generate a TV picture and arranged to provide a sufficient lower insertion loss to the TV channel signals so as not to interfere with the generation of a TV picture therefrom, and switching circuit means in said first and second circuit paths respective to said control signals from said control unit to open and close alternate ones of said first and second circuit paths, each subscriber control unit including an automatically resettable over-current protection device responsive to an increase in current from said power supply means beyond a predetermined maximum current to limit the current supplied from said subscriber control unit to the respective filter unit, said protection device comprising a mono-stable circuit defined by a pair of transistors one of which is normally on and the other of which is normally off, means connecting the filter unit in series with the normally on transistor, threshold detection means for detecting the voltage across the normally on transistor and for switching on the normally off transistor when the voltage across the normally on transistor exceeds a predetermined maximum, and delay capacitor means for reducing the rate of increase of voltage across the normally on transistor.

14. A secure pay-for-use television distribution system comprising a cable distribution network arranged to distribute Subscription television and pay-for-use television signals from a central cable station to a plurality of subscriber premises, a plurality of filter units each mounted between the cable network and a subscriber premises to control the transmission of signals to the subscriber premises, a plurality of subscriber actuable control units each for mounting in a respective subscriber premises and connectable to the respective filter unit by a line for supplying control signals to the respective filter unit and for receiving therefrom the transmitted signals, each said filter unit comprising inlet terminal means for connection to said line, means defining a first and a second circuit path between said inlet terminal means and said outlet terminal means, filter means in at least said first circuit path arranged to provide sufficient rejection loss to said pay-for-use television signals so that the pay-for-use signals emitted from the first circuit path cannot generate a TV picture and arranged to provide a sufficiently low insertion loss to the Subscription television signals so as not to interfere with the generation of a TV picture therefrom, switching circuit means in said first and second circuit paths responsive to said control signals from said control unit to open and close alternate ones of said first and second circuit paths, and means for metering and accumulating time during which said second circuit path is closed, said cable distribution network comprising a cable distribution trunking having a plurality of amplifiers and a plurality of drop-off taps each of which is associated with a respective one of a plurality of groups of said plurality of subscribers premises and at each of which signals for a respective group are extracted from the trunking, and a fibre-optic distribution network including a central fibre-optic communicating from said central fibre-optic station to a respective one of said plurality of separate groups of said plurality of subscriber premises, said central station including a plurality of transmitting and modulating means each associated with a respective one of the fibres, each of said transmitting and modulating means being arranged to transmit to the respective one of said groups a plurality of channels including a control channel providing a schedule of programs to be transmitted on said plurality of channels and to modulate the channels onto a band of channels separated by frequency in such manner that the signals on each of said plurality of channels when translated from fibre-optic signals to electrical signals can be directly decoded by a television set at the subscribers premises, and a plurality of translating units each associated with a respective one of the drop-off taps and each arranged to translate the fibre-optic signals of said plurality of channels from fibre-optic communication on said fibre to electrical signals on said drop-off tap, and means at said central station for entering into a time slot on one of said plurality of channels and onto said schedule on said control channel a program requested by a subscriber and for recording to an account of the subscriber a fee for said program.

* * * * *